United States Patent
Choi et al.

(10) Patent No.: US 10,854,879 B2
(45) Date of Patent: Dec. 1, 2020

(54) COMPOSITE MEMBRANE FOR LITHIUM BATTERY, CATHODE FOR LITHIUM BATTERY, AND LITHIUM BATTERY COMPRISING THE COMPOSITE MEMBRANE

(71) Applicants: Samsung Electronics Co., Ltd., Suwon-si (KR); Samsung SDI Co., Ltd., Yongin-si (KR)

(72) Inventors: Hongsoo Choi, Seoul (KR); Dongjin Lee, Suwon-si (KR); Wonseok Chang, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 106 days.

(21) Appl. No.: 16/101,783

(22) Filed: Aug. 13, 2018

(65) Prior Publication Data
US 2019/0097232 A1    Mar. 28, 2019

(30) Foreign Application Priority Data

Sep. 28, 2017  (KR) .................. 10-2017-0126353
Jun. 8, 2018   (KR) .................. 10-2018-0066092

(51) Int. Cl.
*H01M 4/60*    (2006.01)
*H01M 10/052*  (2010.01)
(Continued)

(52) U.S. Cl.
CPC ............ *H01M 4/604* (2013.01); *C08L 33/04* (2013.01); *H01M 2/1653* (2013.01);
(Continued)

(58) Field of Classification Search
None
See application file for complete search history.

(56) References Cited

U.S. PATENT DOCUMENTS 9,203,109 B2    12/2015  Hu et al.
2010/0221614 A1*  9/2010  Bertin .................. C08J 3/20
                                              429/309
(Continued)

FOREIGN PATENT DOCUMENTS

KR    101379361 B1    3/2014
KR    20160075233 A   6/2016
KR    101747864 B1    6/2017

OTHER PUBLICATIONS

Hu, Qichao & Caputo, Antonio & Sadoway, Donald. (2013). Solid-state Graft Copolymer Electrolytes for Lithium Battery Applications. Journal of visualized experiments: JoVE. 10.3791/50067 (Year: 2013).*

(Continued)

*Primary Examiner* — Ula C Ruddock
*Assistant Examiner* — Amanda Rosenbaum
(74) *Attorney, Agent, or Firm* — Cantor Colburn LLP

(57) ABSTRACT

A composite membrane for a lithium battery, a cathode for a lithium battery, and a lithium battery including the com- (Continued)

posite membrane. The composite membrane includes a copolymer including a first repeating unit represented by Formula 1 and a second repeating unit represented by Formula 2:

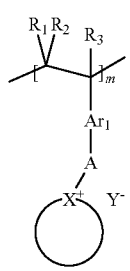

Formula 1

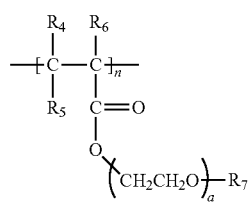

Formula 2 wherein $Ar_1$, $R_1$, $R_2$, $R_3$, A,

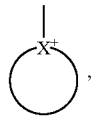

$Y^-$, and m in Formula 1, and $R_4$ to $R_7$, a, and n in Formula 2, are the same as defined in the specification.

24 Claims, 10 Drawing Sheets

(51) Int. Cl.
| | | |
|---|---|---|
| H01M 4/62 | (2006.01) | |
| C08L 33/04 | (2006.01) | |
| H01M 2/16 | (2006.01) | |
| H01M 4/38 | (2006.01) | |
| H01M 4/02 | (2006.01) | |
| C08F 220/28 | (2006.01) | |
| H01M 4/13 | (2010.01) | |
| H01M 10/0525 | (2010.01) | |

(52) U.S. Cl.
CPC ............ *H01M 4/382* (2013.01); *H01M 4/62* (2013.01); *H01M 10/052* (2013.01); *C08F 220/28* (2013.01); *H01M 2004/028* (2013.01)

(56) References Cited

U.S. PATENT DOCUMENTS

| 2016/0064770 A1* | 3/2016 | Lee ...................... H01M 10/056 429/303 |
| 2016/0181658 A1* | 6/2016 | Kim ................... H01M 10/052 429/200 |
| 2016/0248064 A1 | 8/2016 | Elabd et al. |
| 2017/0346099 A1 | 11/2017 | Choi et al. |

OTHER PUBLICATIONS

Yuan, Jiayin, and Markus Antonietti. "Poly(Ionic Liquid)s: Polymers Expanding Classical Property Profiles." Polymer, vol. 52, No. 7, Jan. 28, 2011, pp. 1469-1482., doi:10.1016/j.polymer.2011.01. 043. (Year: 2011).*
Green, Matthew D., et al. "Tailoring Macromolecular Architecture with Imidazole Functionality: A Perspective for Controlled Polymerization Processes." European Polymer Journal, vol. 47, No. 4, 2011, pp. 486-496., doi:10.1016/j.eurpolymj.2010.09.035. (Year: 2011).*
Caizhen Liang, Bin Wang et al. "Dispersion of Multi-Walled Carbon Nanotubes by Polymers with Carbazole Pendants" The Journal of Physical Chemistry B 2017 121 (35), 8408-8416 DOI: 10.1021/acs.jpcb.7b05481 (Year: 2017).*
Chi, W.S., Ahn, S.H., Jeon, H. et al. Rubbery copolymer electrolytes containing polymerized ionic liquid for dye-sensitized solar cells. J Solid State Electrochem 16, 3037-3043 (2012). https://doi.org/10.1007/s10008-012-1738-z (Year: 2012).*
Irene Osada et al., "Ionic-Liquid-Based Polymer Electrolytes for Battery Applications," Lithium Batteries, Nov. 19, 2015, pp. 500-513, https://doi.org/10.1002/anie.201504971.
Joo Hwan Koh et al., "Amphiphilic Polymer Electrolytes Consisting of PVC-g-POEM Comb-Like Copolymer and LiCF3SO3," Journal of Polymer Science Part B: Polymer Physics, pp. 1443-1451, Jun. 10, 2009, vol. 47, Issue 15.
Ju-Sik Kim et al., "Cycling stability of Li metal in a mixed carbonate—ionic liquid electrolyte for lithium secondarybatteries," May 8, 2017, RSC Advances, pp. 24679-24682, vol. 7.
Kazuo Murata et al., "An overview of the research and development of solid polymer electrolyte batteries," Electrochimica Acta, Jan. 3, 2000, pp. 1501-1508, vol. 45, Issue 8-9.
Qichao Hu et al., "Solid-state Graft Copolymer Electrolytes for Lithium Battery Applications," Journal of Visualized Experiments, Aug. 12, 2013, pp. 1-9, vol. 78, e50067, DOI:10.3791/50067.

* cited by examiner

COMPOSITE MEMBRANE FOR LITHIUM BATTERY, CATHODE FOR LITHIUM BATTERY, AND LITHIUM BATTERY COMPRISING THE COMPOSITE MEMBRANE

CROSS-REFERENCE TO RELATED APPLICATION

This application claims priority to and the benefit of Korean Patent Application No. 10-2017-0126353, filed on Sep. 28, 2017, and Korean Patent Application No. 10-2018-0066092 filed on Jun. 8, 2018, in the Korean Intellectual Property Office, and all the benefits accruing therefrom under 35 U.S.C. § 119, the contents of which are incorporated herein in their entirety by reference.

BACKGROUND

1. Field

The present disclosure relates to a composite membrane for a lithium battery, a cathode for a lithium battery, and a lithium battery including the composite membrane.

2. Description of the Related Art

Along with the rapidly expanding market growth of reusable energy storage devices applicable to electric vehicles and portable electronic devices, there is an increasing demand for lithium batteries, as energy storage devices, having high capacity characteristics and improved stability. To satisfy this demand, a variety of research is being carried out on the use of a lithium metal electrode as an anode for a lithium battery, so as to increase charge storage capacity at high voltage. A lithium metal electrode has a very high electrical capacity per unit mass. In a lithium metal electrode, a dendritic structure may form on a lithium metal surface during intercalation/deintercalation of lithium ions, which may cause a short circuit between the cathode and the anode. Therefore, there is a need to suppress dendrite formation on the lithium metal surface.

SUMMARY

Provided is a composite membrane for a lithium battery.
Provided is a lithium battery including the composite membrane.
Provided is a cathode for a lithium battery.
Additional aspects will be set forth in part in the description which follows and, in part, will be apparent from the description, or may be learned by practice of embodiments.

According to an embodiment, a composite membrane for a lithium battery includes a copolymer including a first repeating unit represented by Formula 1 and a second repeating unit represented by Formula 2:

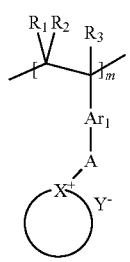

Formula 1 wherein, in Formula 1, $Ar_1$ is a substituted or unsubstituted C6-C30 arylene group or a substituted or unsubstituted C6-C30 heteroarylene group, $R_1$, $R_2$, and $R_3$ are each independently hydrogen, an unsubstituted or substituted C1-C20 alkyl group, an unsubstituted or substituted C6-C20 aryl group, or an unsubstituted or substituted C3-C30 heteroaryl group, A is a chemical bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group,

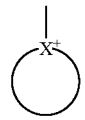

is a 3-membered to 31-membered ring system including 2 to 30 carbon atoms,

X is S, N, N(R), or P(R'), wherein

R and R' are each independently hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 aryl alkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 cycloalkyl group, an unsubstituted or substituted C2-C30 alkenyl group, an unsubstituted or substituted C3-C30 heteroaryloxy group, an unsubstituted or substituted C3-C30 heterocycloalkyl group, or an unsubstituted or substituted C3-C30 alkynyl group, and $Y^-$ is an anion,

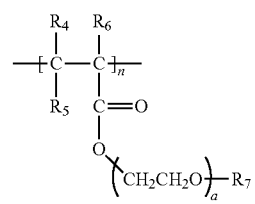

Formula 2 wherein, in Formula 2, $R_4$, $R_5$, and $R_6$ are each independently hydrogen, an unsubstituted or substituted C1-C20 alkyl group, an unsubstituted or substituted C6-C20 aryl group, or an unsubstituted or substituted C3-C30 heteroaryl group, each $R_7$ is independently hydrogen, an unsubstituted or substituted C1-C20 alkyl group, or unsubstituted or substituted C6-C20 aryl group, and a is an integer of 1 to 10, and in Formulae 1 and 2, m and n are mole fractions of the first repeating unit represented by Formula 1 and the second repeating unit represented by Formula 2, respectively, wherein the sum of m and n is 1, and m and n are each independently greater than 0 and less than 1.

According to an embodiment, a lithium battery includes: a cathode; an anode; and the above-described composite membrane disposed between the cathode and the anode.

According to an embodiment, a cathode for a lithium battery includes: a cathode active material; and a copolymer including a first repeating unit represented by Formula 1 and a second repeating unit represented by Formula 2:

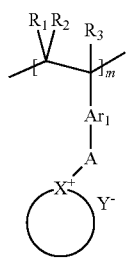

Formula 1

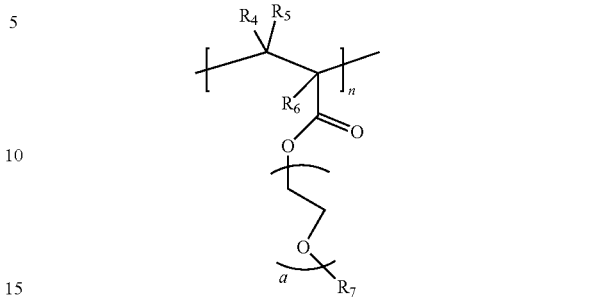

wherein, in Formula 1, $Ar_1$ is a substituted or unsubstituted C6-C30 arylene group or a substituted or unsubstituted C6-C30 heteroarylene group, $R_1$, $R_2$, and $R_3$ are each independently hydrogen, an unsubstituted or substituted C1-C20 alkyl group, an unsubstituted or substituted C6-C20 aryl group, or an unsubstituted or substituted C3-C30 heteroaryl group, A is a chemical bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group,

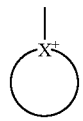

is a 3-membered to 31-membered ring system including 2 to 30 carbon atoms,

X is S, N, N(R), or P(R'),

R and R' are each independently hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 aryl alkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 cycloalkyl group, an unsubstituted or substituted C2-C30 alkenyl group, an unsubstituted or substituted C3-C30 heteroaryloxy group, an unsubstituted or substituted C3-C30 heterocycloalkyl group or an unsubstituted or substituted C3-C30 alkynyl group, and $Y^-$ is an anion, wherein, in Formula 2, $R_4$, $R_5$, and $R_6$ are each independently hydrogen, an unsubstituted or substituted C1-C20 alkyl group, an unsubstituted or substituted C6-C20 aryl group, or an unsubstituted or substituted C3-C30 heteroaryl group, each $R_7$ is independently hydrogen, an unsubstituted or substituted C1-C20 alkyl group, or unsubstituted or substituted C6-C20 aryl group, and a is an integer of 1 to 10, and in Formulae 1 and 2, m and n are mole fractions of the first repeating unit represented by Formula 1 and the second repeating unit represented by Formula 2, respectively, wherein the sum of m and n is 1, and m and n are each independently greater than 0 and less than 1.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
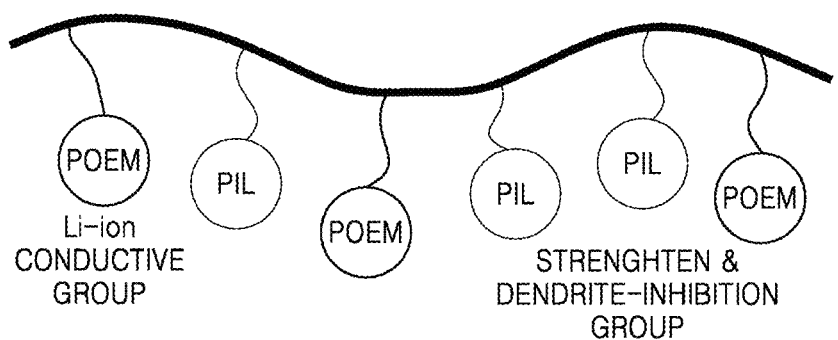
FIG. 1 is a schematic illustration of an embodiment of a structure of a copolymer.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A C rate means a current which will discharge a battery in one hour, e.g., a C rate for a battery having a discharge capacity of 1.6 ampere-hours would be 1.6 amperes.

Hereinafter, embodiments of a composite membrane for a lithium battery, a cathode for a lithium battery, and a lithium battery including the composite membrane now will be described in greater detail.

According to an embodiment, a composite membrane for a lithium battery includes a copolymer including a first repeating unit represented by Formula 1 and a second repeating unit represented by Formula 2.

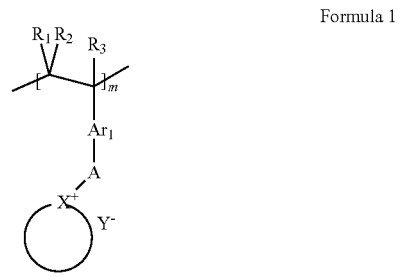

Formula 1

In Formula 1, $Ar_1$ may be a substituted or unsubstituted C6-C30 arylene group or a substituted or unsubstituted C6-C30 heteroarylene group, $R_1$, $R_2$ and $R_3$ may each independently be hydrogen, an unsubstituted or substituted C1-C20 alkyl group, an unsubstituted or substituted C6-C20 aryl group, or an unsubstituted or substituted C3-C30 heteroaryl group, A is a chemical bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group,

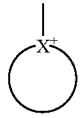

may be a 3-membered to 31-membered ring system including 2 to 30 carbon atoms,

X may be S, N, N(R) or P(R'),

R and R' may each independently be hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 aryl alkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 cycloalkyl group, an unsubstituted or substituted C2-C30 alkenyl group, an unsubstituted or substituted C3-C30 heteroaryloxy group, an unsubstituted or substituted C3-C30 heterocycloalkyl group, or an unsubstituted or substituted C3-C30 alkynyl group; and $Y^-$ may be an anion.

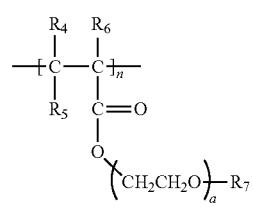

Formula 2

In Formula 2, $R_4$, $R_5$, and $R_6$ may each independently be hydrogen, an unsubstituted or substituted C1-C20 alkyl group, an unsubstituted or substituted C6-C20 aryl group, or an unsubstituted or substituted C3-C30 heteroaryl group, each $R_7$ may independently be hydrogen, an unsubstituted or substituted C1-C20 alkyl group, or unsubstituted or substituted C6-C20 aryl group, and a may be an integer of 1 to 10.

In Formulae 1 and 2, m and n may be mole fractions of the first repeating unit represented by Formula 1 and the second repeating unit represented by Formula 2, respectively, wherein the sum of m and n may be 1, and m and n may each independently be greater than 0 and less than 1.

The 3-membered to 31-membered ring system including 2 to 30 carbon atoms may be a saturated ring or an unsaturated ring.

In Formula 1, $Ar_1$ may include a phenylene group, a biphenylene group, a naphthalenylene group, a phenanthrenylene group, a triphenylenylene group, an anthracenylene group, a fluorenylene group, or a carbazolylene group.

In Formula 1, $Ar_1$ may include a group represented by Formula 3-1, Formula 3-2, Formula 3-3, Formula 3-4, or Formula 3-5.

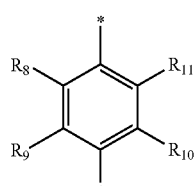

Formula 3-1

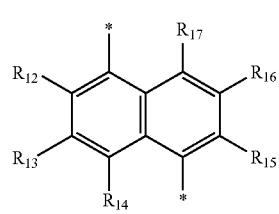

Formula 3-2

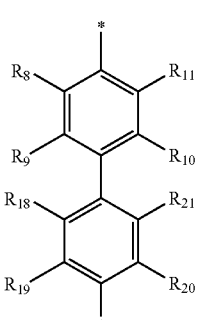

Formula 3-3

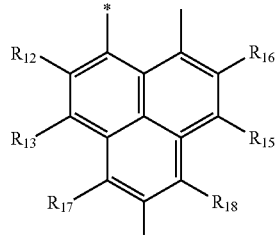

Formula 3-4

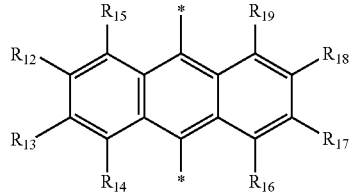

Formula 3-5

In Formula 3-1, Formula 3-2, Formula 3-3, Formula 3-4, and Formula 3-5, * indicates a point of attachment, and $R_{11}$ to $R_{19}$ may each independently be hydrogen, an unsubstituted or substituted C1-C20 alkyl group, an unsubstituted or substituted C6-C20 aryl group, or an unsubstituted or substituted C3-C30 heteroaryl group.

In the first repeating unit of Formula 1, $Ar_1$ may be an arylene or heteroarylene group as described above. The copolymer including the first repeating unit of Formula 1 including an arylene group and/or a heteroarylene group may have improved mechanical properties due to π-π interactions of the arylene group or heteroarylene group. In Formula 1, when $Ar_1$ is an alkylene group or an aliphatic group such as a divalent aliphatic ring, the copolymer may have seriously reduced mechanical properties compared to when $Ar_1$ is an arylene group or a heteroarylene group.

Theoretically, a lithium battery using a lithium metal electrode as an anode may provide a large energy source, while a liquid electrolyte of the lithium battery may also undergo an exothermic reaction by reacting with moisture and oxygen, and the lithium battery may have reduced thermal stability compared to when a graphite or carbonaceous anode is used. In addition, due to high reactivity of the lithium metal electrode with a liquid electrolyte, an irreversible layer may be formed, leading to deterioration in cycle characteristics of the lithium battery. To solve these problems, a lithium ion conductive polymer electrolyte may be applied on the lithium metal electrode. As the lithium ion conductive polymer electrolyte, an ether-based electrolyte such as a polyethylene oxide electrolyte may be used. However, the ether-based electrolyte may have relatively low lithium ion mobility, relative to the liquid electrolyte, and insufficient mechanical properties, thus leading to deterioration in electrochemical performance.

When increasing the temperature of a lithium battery, it may be difficult for the ether-based electrolyte to retain a free-standing film shape, and physical properties may be further deteriorated, causing a short circuit. In addition, due to formation and growth of lithium dendrite on the surface of the lithium anode, the lithium battery may have reduced cycle characteristics.

In this regard, while not wanting to be bound by theory, it is understood that the composite membrane disclosed herein may have improved electrochemical stability by suppressing side reactions with a lithium anode. The novel composite membrane may be used as a lithium anode protection layer, an electrolyte, or a lithium anode protection layer and electrolyte.

In an embodiment, the composite membrane for a lithium battery may include a copolymer including a first repeating unit that may have good lithium ion mobility and include electrochemically stable polymerized ionic liquid ("PIL"), and a lithium ion conductive second repeating unit. The second repeating unit may be a polyoxyethylene methacrylate ("POEM") repeating unit. The copolymer may improve electrochemical characteristics of the lithium battery by improving low physical properties of the second repeating unit.

FIG. 1 is a schematic illustration of a structure of a copolymer forming a composite membrane for a lithium battery according to an embodiment, the copolymer including a first repeating unit represented by Formula 1 (including PIL) and a second repeating unit represented by Formula 2 (including POEM).

The first repeating unit of the copolymer may include a group providing structural strength and inhibiting lithium dendrite growth, and the second repeating unit of the copolymer may include a POEM group as a lithium-ion conductive group. As shown in FIG. 1, the copolymer of the composite membrane according to an embodiment may be a heterogeneous polymer including the first repeating unit ("PIL") and the lithium-ion conductive second repeating unit ("POEM"). Due to the heterogeneous state of the copolymer, a lithium dendrite growth inhibitory effect may be further improved, compared to when a homogeneous polymer is used.

As used herein, the term "heterogeneous polymer" may refer to a polymer in which the first repeating units ("PIL") and the lithium-ion conductive second repeating units ("POEMs") are irregularly or inhomogeneously present as shown in FIG. 1.

The copolymer may be a random copolymer or a block copolymer.

The random copolymer may include first repeating units ("PILs") and second repeating units ("POEMs") in a heterogeneous state. Since the random copolymer includes the first repeating units and the second repeating units present in a heterogeneous state and has reduced interactions between the first repeating units, compared to a block copolymer, migration of the first repeating units to a lithium domain of the lithium anode surface is facilitated, so as to enable effective blocking around lithium dendrites. Consequently, the entire copolymer may be provided with a uniform charge delocalization effect, and thus dendrite formation caused by a local increase in lithium ions on the lithium metal surface may be effectively inhibited.

The random copolymer may be synthesized at a lower cost, compared to block copolymers. The random copolymer may also exhibit similar overall physical properties of the backbone, compared to those of a block copolymer.

For example, compared to the random copolymer as described above, it may be difficult for a block copolymer including the above-described first and second repeating units to uniformly inhibit lithium dendrite growth on the lithium anode surface due to local presence of the first repeating units and the second repeating units not including an ionic liquid moiety. In addition, in the block copolymer, charge localization may occur in a polymer block domain including, e.g., consisting of, the ionic liquid moiety-free second repeating units, thus making it difficult to effectively inhibit the growth of dendrites caused by local reduction of lithium ions on the lithium metal surface. Compared to the random copolymer, migration of the first repeating units to a lithium dendrite site may become relatively difficult due to interactions of the first repeating units, and thus blocking of lithium dendrites may be less likely to occur. Therefore, the random copolymer may have a further improved lithium dendrite inhibitory effect than the block copolymer.

The composite membrane according to an embodiment may have improved mechanical properties at high temperature, compared to a POEM membrane, and retain a membrane form, by including the copolymer including ionic liquid unit that has good mechanical properties and reduces lithium metal dendrites. The composite membrane may support an increased amount of lithium salt. Accordingly, using the composite membrane, a lithium battery having improved lithium ion transfer ability and cycle characteristics may be manufactured.

The composite membrane for a lithium battery, according to an embodiment, may be used as an anode protection layer or an electrolyte or an anode protection layer and electrolyte.

In Formula 1,

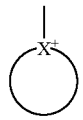

may be an aliphatic ring or an imidazole ring that is a nitrogen-containing aromatic ring.

For example,

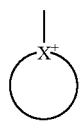

may be an aliphatic ring. As

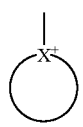

in the copolymer forms an aliphatic ring, the copolymer may be stable in a wider voltage range, compared to an ionic liquid polymer including aromatic rings, and thus may provide a wider electrochemical window. For example, the copolymer may provide a wider reduction voltage range for Li metal. For example, the random copolymer may be electrochemically stable even in a negative voltage range with respect to Li metal. The expression "electrochemically stable" used herein may mean that a current generated by oxidation or reduction of the copolymer itself corresponds to ½ or less of a current generated by oxidation/reduction of lithium.

The aliphatic ring of the copolymer is not particularly limited and any suitable aliphatic ring capable of acting as a moiety corresponding to a cation of ionic liquid may be used.

In Formula 1,

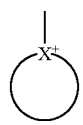

may include a group represented by Formula 4-1, Formula 4-2, Formula 4-3, Formula 4-4, or Formula 4a.

Formula 4-1

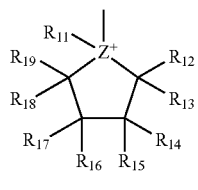

Formula 4-2

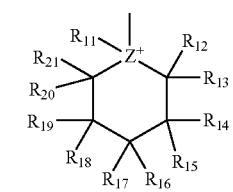

Formula 4-3

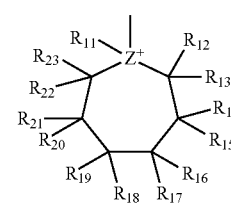

Formula 4-4

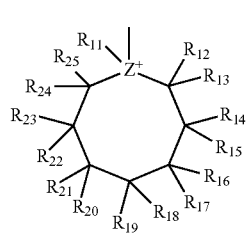

In Formula 4-1, Formula 4-2, Formula 4-3, and Formula 4-4, Z may be S, N or P, and $R_{11}$ to $R_{25}$ may each independently be hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group, wherein $R_{11}$ may be absent if Z is S.

Formula 4a

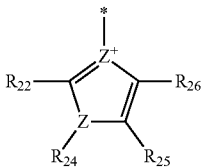

In Formula 4a, $R_{22}$ to $R_{26}$ may be defined the same as $R_{11}$ to $R_{25}$ in Formula 4-1, Formula 4-2, Formula 4-3, and Formula 4-4, and Z may be N.

In Formula 1,

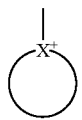

may include a group represented by Formula 5-1 or Formula 5-2; and $Y^-$ may include $BF_4^-$, $PF_6^-$, $AsF_6^-$, $SbF_6^-$, $AlCl_4^-$, $HSO_4^-$, $CH_3SO_3^-$, $(CF_3SO_2)_2N—$, $Cl^-$, $Br^-$, $I^-$, $SO_4^{2-}$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof, Formula 5-1

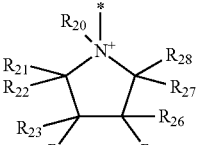

Formula 5-2

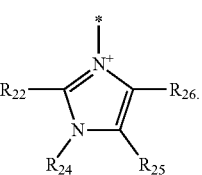

In Formula 5-1 and Formula 5-2, $R_{20}$ to $R_{28}$ may each independently be hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

The composite membrane according to an embodiment may include a lithium salt. The amount of the lithium salt may be about 1 part to about 90 parts by weight, for example, about 20 parts to about 60 parts by weight, based on 100 parts by weight of a total weight of the composite membrane.

In the copolymer including a first repeating unit of Formula 1 and a second repeating unit of Formula 2, a molar ratio of the first repeating unit of Formula 1 to the second repeating unit of Formula 2 may be about 1:99 to about 99:1. In the copolymer according to an embodiment, a molar ratio of the first repeating unit represented by Formula 1 to the second repeating unit represented by Formula 2 may be, for example, about 1:1 to about 4:1. When the amount of the first repeating unit represented by Formula 1 satisfies these ranges, a composite membrane having improved ion conductivity may be obtained without deterioration in mechanical strength of the copolymer and the composite membrane including the copolymer.

The copolymer according to an embodiment may be a copolymer represented by Formula 6.

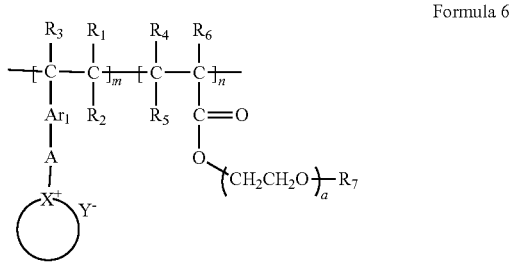

Formula 6

In Formula 6, $Ar_1$ may be a substituted or unsubstituted C6-C30 arylene group, $R_1$, $R_2$ and $R_3$ may each independently be hydrogen, an unsubstituted or substituted C1-C20 alkyl group, an unsubstituted or substituted C6-C20 aryl group, or an unsubstituted or substituted C3-C30 heteroaryl group, A may be a chemical bond, an unsubstituted or substituted C1-C30 alkylene group, or an unsubstituted or substituted C6-C30 arylene group, and

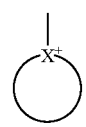

may be a group represented by Formula 5-1 or Formula 5-2

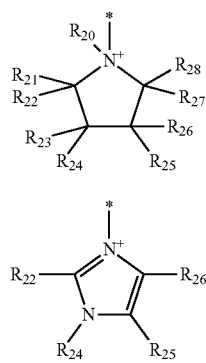

Formula 5-1

Formula 5-2 wherein in Formula 5-1 and Formula 5-2, $R_{20}$ to $R_{28}$ may each independently be hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group; * indicates a point of attachment site; $Y^-$ may include $BF_4^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof;

each $R_7$ may independently be hydrogen, an unsubstituted or substituted C1-C20 alkyl group, or unsubstituted or substituted C6-C20 aryl group, a may be an integer of 1 to 10, and m and n may each independently be 0.01 to 0.99, and the sum of m and n may be 1.

The copolymer according to an embodiment may include a compound represented by Formula 6a, Formula 6b, Formula 6c, Formula 6d, or a combination thereof.

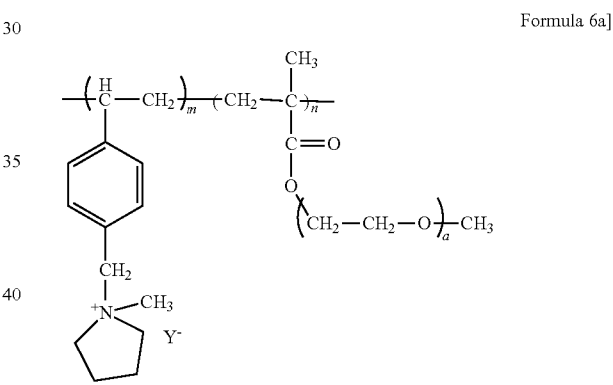

Formula 6a]

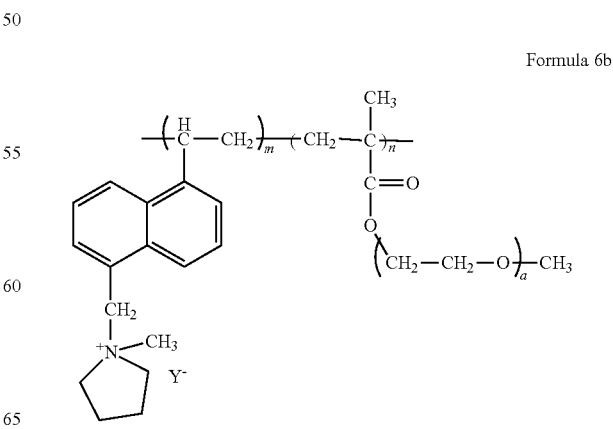

Formula 6b

Formula 6c

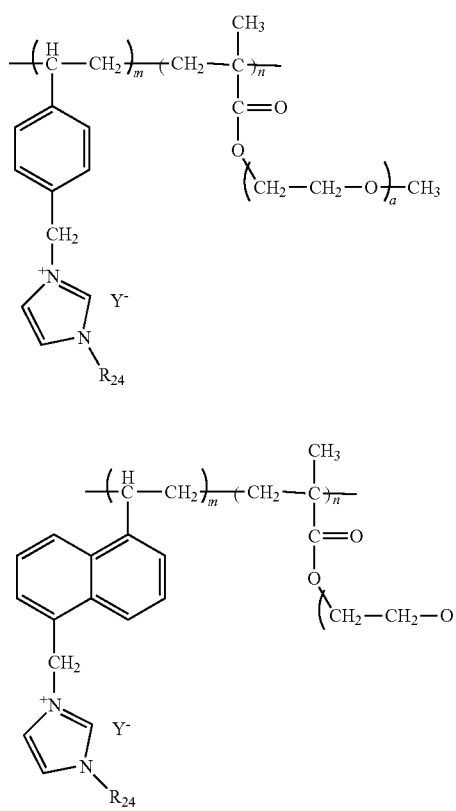

Formula 6d

Formula 6f

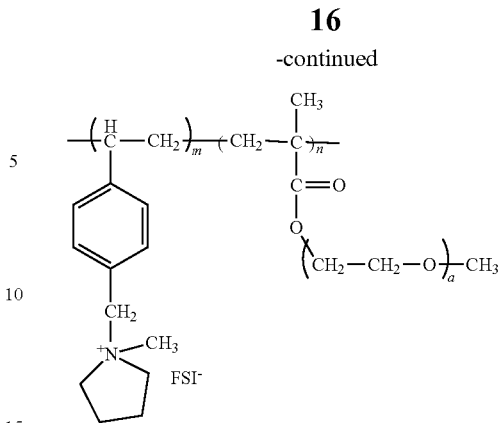

Formula 6g

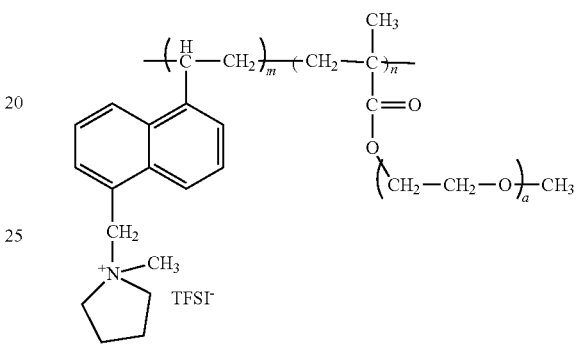

In Formulae 6e to 6g, a may be an integer of 1 to 10; m and n may each independently be 0.01 to 0.99, and the sum of m and n may be 1. The copolymer may have a degree of polymerization of about 10 to about 5,000.

The copolymer may have a degree of polymerization of about 10 to about 5,000. The copolymer may have a weight average molecular weight of about 3,000 Daltons (Da) to about 400,000 Dalton, for example, about 5,000 Dalton to about 200,000 Dalton. When the copolymer has a degree of polymerization and a weight average molecular weight within the above-described ranges, the copolymer may have improved mechanical strength and effectively inhibit growth of lithium dendrites, and thus may further improve performance of a lithium battery. The weight average molecular weight was measured with respect to a polymethylmethacrylate ("PMMA") standard sample by using gel permeation chromatography ("GPC").

In Formulae 6a to 6d, Y⁻ may include $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $ClO_4^-$, $CF_3SO_3^-$, $CF_3CO_2^-$, $(C^2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CHFCF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof; a may be an integer of 1 to 10; $R_{24}$ may be a C1-C10 alkyl group, m and n may each independently be 0.01 to 0.99, and the sum of m and n may be 1. The copolymer may have a degree of polymerization of about 10 to about 5,000.

For example, the copolymer may be a compound represented by Formula 6e, Formula 6f, or Formula 6g.

For example, the copolymer may have a polydispersity index ("PDI") of about 1 to about 3, for example, about 1 to about 2.0 or about 1.2 to about 2.8. When including the random copolymer having a PDI within these ranges, a lithium battery may have further improved performance.

For example, the copolymer may have a glass transition temperature ($T_g$) of about 30° C. to about 90° C. For example, the random polymer may have a glass transition temperature ($T_g$) of about 55° C. at a weight average molecular weight of about 37,000 Dalton. By including the copolymer having a glass transition temperature ($T_g$) within these ranges, a lithium battery may have further improved performance.

The copolymer may be electrochemically stable at up to −0.4 volts (V) with respect to Li. That is, a reduction current due to a side reaction of the random copolymer may be disregarded up to −0.4 V with respect to Li. For example, the copolymer may provide an electrochemically stable, wide voltage window ranging from about −0.4 V to about 6.2 V, Formula 6e

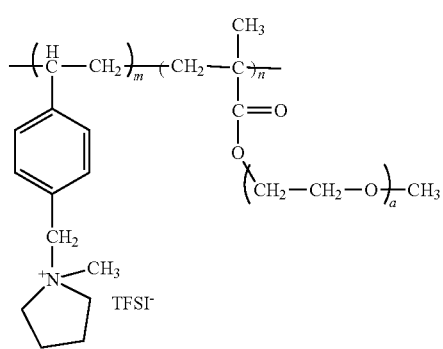

for example, about −0.4 V to about 5.5 V, about −0.4 V to about 5.0 V, or about −0.4 V to about 4.5 V, with respect to Li metal.

The composite membrane according to an embodiment may be used as an electrolyte. By including the copolymer according to an embodiment, an electrolyte having improved durability and ionic conductivity may be obtained. In addition, a lithium battery including this electrolyte may have improved charge and discharge characteristics.

The electrolyte including the copolymer according to an embodiment may further include a lithium salt. For example, the lithium salt may include $LiPF_6$, $LiBF_4$, $LiSbF_6$, $LiAsF_6$, $LiN(SO_2C_2F_5)_2$, $Li(CF_3SO_2)_2N$, $Li(FSO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y may each independently be about 1 to about 30), LiF, LiBr, LiCl, LiI, $LiB(C_2O_4)_2$, lithium bis (oxalato) borate ("LiBOB"), lithium bis(trifluoromethanesulfonyl)imide ("LiTFSI"), $LiNO_3$, or a combination thereof. However, embodiments are not limited thereto. Any suitable lithium salt available in the art may be used.

The electrolyte including the copolymer according to any of the above-described embodiments may further include an additional polymer. The additional polymer is not particularly limited and any suitable polymer that may be used as an electrolyte in the art may be used. For example, the electrolyte may further include polyethyleneoxide ("PEO"), polyvinyl alcohol ("PVA"), or the like.

The electrolyte including the copolymer according to any of the above-described embodiments may be a liquid electrolyte or a solid electrolyte. For example, the liquid electrolyte including the copolymer according to an embodiment may further include an organic solvent, an ionic liquid, or a combination thereof, and thus may be in a liquid state at room temperature.

The organic solvent may include an aprotic solvent. For example, the aprotic solvent may be a carbonate-based solvent, an ester-based solvent, an ether-based solvent, a ketone-based solvent, or an alcohol-based solvent. Examples of the carbonate-based solvent may include dimethyl carbonate ("DMC"), diethyl carbonate ("DEC"), ethyl methyl carbonate ("EMC"), dipropyl carbonate ("DPC"), methyl propyl carbonate ("MPC"), ethyl propyl carbonate ("EPC"), ethylene carbonate ("EC"), propylene carbonate ("PC"), and butylene carbonate ("BC"). Examples of the ester-based solvent may include methyl acetate, ethyl acetate, n-propyl acetate, dimethyl acetate, methyl propionate, ethyl propionate, γ-butyrolactone, decanolide, valerolactone, mevalonolactone, and caprolactone. Examples of the ether-based solvent may include dibutyl ether, tetraglyme, diglyme, dimethoxyethane, 2-methyl tetrahydrofuran, and tetrahydrofuran. An example of the ketone-based solvent may be cyclohexanone. Examples of the alcohol-based solvent may include ethyl alcohol, isopropyl alcohol, or the like. However, embodiments are not limited thereto. Any suitable aprotic solvent available in the art may be used.

The organic solvent may include tetraethylene glycol dimethyl ether ("TEGDME").

The ionic liquid may be any suitable ionic material in a molten state at room temperature and including cations and anions, not particularly limited. The ionic liquid may include a cation of, for example, imidazolium, ammonium, pyrrolidinium, or piperidinium, and an anion of bis(fluorosulfonyl) imide, fluorosulfonylamide, fluoroborate, or fluorophosphate. However, embodiments are not limited thereto. Examples of cations may include alkylammonium such as triethylammonium, imidazolium such as ethylmethylimidazolium and butylmethylimidazolium, or pyrrolidium such as 1-methyl-1-propylpyrrolidium or methylpropylpiperidinium. Examples of anions may include bis(trifluoromethylsulfonyl)imide ("TFSI"), bis(pentafluoroethylsulfonyl) imide ("BETI"), tetrafluoroborate ($BF_4$), or hexafluorophosphate ($PF_6$).

For example, the ionic liquid may be [emim]Cl/$AlCl_3$ (wherein emim=ethyl methyl imidazolium), [bmpyr]$NTf_2$ (wherein bmpyr=butyl methyl pyridinium), [bpy]Br/$AlCl_3$ (wherein bpy=4,4'-bipyridine), [choline]Cl/$CrCl_3.6H_2O$, [Hpy$(CH_2)_3$pyH][$NTf_2$]$_2$ (wherein $NTf_2$=bis(trifluoromethanesulfonimide), [emim]OTf/[hmim]I (wherein hmim=hexyl methyl imidazolium), [choline]Cl/$HOCH_2CH_2OH$, [$Et_2MeN(CH_2CH_2OMe)$]$BF_4$ (wherein Et=ethyl, Me=methyl, Pr=propyl, Bu=butyl, Ph=phenyl, Oct=octyl, and Hex=hexyl), [$Bu_3PCH_2CH_2C_8F_{17}$]OTf (wherein OTf=trifluoromethane sulfonate), [bmim]$PF_6$ (wherein bmim=butyl methyl imidazolium), [bmim]$BF_4$, [omim]$PF_6$ (wherein omim=octyl methyl imidazolium), [$Oct_3PC_{18}H_{37}$]I, [$NC(CH_2)_3mim$]$NTf_2$ (wherein mim=methyl imidazolium), [$Pr_4N$][$B(CN)_4$], [bmim]$NTf_2$, [bmim]Cl, [bmim][$Me(OCH_2CH_2)_2OSO_3$], [$PhCH_2mim$]OTf, [$Me_3NCH(Me)CH(OH)Ph$]$NTf_2$, [pmim][$(HO)_2PO_2$] (wherein pmim=propyl methyl imidazolium), [(6-Me) bquin]$NTf_2$ (wherein bquin=butyl quinolinium), [bmim][$Cu_2Cl_3$], [$C_{18}H_{37}OCH_2mim$]$BF_4$ (wherein mim=methyl imidazolium), [heim]$PF_6$ (wherein heim=hexyl ethyl imidazolium), [$mim(CH_2CH_2O)_2CH_2CH_2mim$][$NTf_2$]$_2$ (wherein mim=methyl imidazolium), [obim]$PF_6$ (wherein obim=octyl butyl imidazolium), [oquin]$NTf_2$ (wherein oquin=octyl quinolinium), [hmim][$PF_3(C_2F_5)_3$], [$C_{14}H_{29}mim$]Br (wherein mim=methyl imidazolium), [$Me_2N(C_{12}H_{25})_2$]$NO_3$, [emim]$BF_4$, [mm(3-$NO_2$)im][dinitrotriazolate], [MeN $(CH_2CH_2OH)_3$][$MeOSO_3$], [$Hex_3PC_{14}H_{29}$]$NTf_2$, [emim][$EtOSO_3$], [choline][ibuprofenate], [emim]$NTf_2$, [emim] [$(EtO)_2PO_2$], [emim]Cl/$CrCl_2$, or [$Hex_3PC_{14}H_{29}$]$N(CN)_2$. However, embodiments are not limited thereto. Any suitable materials available as ionic liquids in the art may be used.

The solid electrolyte including the copolymer according to an embodiment may be in a solid state at room temperature and may not include an organic solvent.

The solid electrolyte may be in a solid state at 50° C. or less, for example, about 30° C. or less or about 25° C. or less. In an embodiment, the solid electrolyte may have a solidification temperature in a range of about 0° C. to about 50° C., for example, about 5° C. to about 40° C. or about 10° C. to about 30° C. By including the copolymer according to an embodiment, the electrolyte may be in a solid state at room temperature. The solid electrolyte may be a solvent-free electrolyte. Stated otherwise, the solid electrolyte may exclude solvent. For example, the solid electrolyte may be a solid polymer electrolyte that does not include a solvent and includes, e.g., consists only of, a copolymer and a lithium salt. Since the electrolyte does not include a solvent, problems caused by a solvent such as a side reaction and leakage of the solvent, and the like, may be prevented.

The solvent-free solid electrolyte is distinguished from a polymer gel electrolyte in which a solid polymer includes a small amount of solvent. The polymer gel electrolyte may have further improved ionic conductivity, for example, when the ion conductive polymer includes a small amount of solvent.

When the composite membrane according to an embodiment is used as a lithium anode protection layer, due to the inclusion of the copolymer in the protection layer, dendrite formation on a surface of the anode may be inhibited during charging and discharging of a lithium battery, and consequentially the lithium battery may have improved charge and discharge characteristics.

The anode may include lithium (Li) metal, a Li metal-based alloy, or a material that allows intercalation and deintercalation of lithium ions. However, embodiments are not limited thereto. Any suitable material available in the art for the anode may be used, provided that the material includes Li or a material that allows intercalation and deintercalation of lithium ions. The anode may be, for example, Li metal. Examples of the Li metal-based alloy may include alloys of lithium with aluminum, tin, magnesium, indium, calcium, titanium, vanadium, or the like.

The protection layer may further include a lithium salt. By further including a lithium salt, the protection layer may have increased ionic conductivity, and interface resistance between the anode and the electrolyte may be reduced. Examples of the lithium salt may be the same as those for the electrolyte including the copolymer.

The composite membrane may have a thickness of about 0.1 micrometers (μm) to about 100 μm. For example, the composite membrane may have a thickness of about 0.5 μm to about 70 μm, about 1 μm to 50 μm, or about 1 μm to about 20 μm. By including the composite membrane having a thickness within these ranges, a lithium battery may have an improved protection function for the lithium anode, facilitate transfer of lithium ions, and thus have improved charge and discharge characteristics.

The composite membrane may be disposed on one surface or both opposite surfaces of the anode. In an embodiment, the composite membrane may completely cover the anode, so that dendrite formation may be effective inhibited over the entire surface of the anode.

The composite membrane may have a single-layer structure or a multi-layer structure. When the composite membrane has a multi-layer structure, physical properties of the composite membrane may be controlled by varying the composition of each of the multiple layers. In the composite membrane having a multi-layer structure, at least one of the layers may include the copolymer according to any of the above-described embodiments.

The composite membrane may have a lithium ion conductivity of greater than about 0.001 millisiemens/centimeter (mS/cm), for example, about 0.01 mS/cm to about 0.5 mS/cm, at about 25° C.

According to an embodiment, a lithium battery includes: a cathode; an anode, and the composite membrane according to any of the above-described embodiments between the cathode and the anode.

The composite membrane may be used for an electrolyte disposed between the cathode and the anode of the lithium battery. The lithium battery may further include a liquid electrolyte or a solid electrolyte. The liquid electrolyte or solid electrolyte may not include the random copolymer.

The lithium battery may be a lithium ion battery or a lithium air battery. The lithium battery may be a primary battery or a secondary battery.

The lithium battery may include, as the anode, a lithium anode including a lithium metal or a lithium alloy electrode. The lithium battery including the lithium anode may be a lithium metal battery.

The anode may be a lithium metal electrode or a lithium metal alloy electrode. In an embodiment, the anode may include a carbonaceous material, silicon, a silicon oxide, a silicon-based alloy, a silicon-carbonaceous material composite, tin, a tin-based alloy, a tin-carbon composite, a metal/metalloid alloyable with lithium, an alloy of the metal/metalloid alloyable with lithium, an oxide of the metal/metalloid alloyable with lithium, or a combination thereof.

The anode may be a lithium metal electrode or a lithium metal alloy electrode. The composite membrane may serve as an anode protection layer, or as an anode protection layer and an electrolyte.

The composite membrane may serve as an electrolyte.

The lithium battery may further include a liquid electrolyte, a solid electrolyte, a gel electrolyte, a polymer ionic liquid, or a combination thereof.

The cathode may include a cathode active material and a copolymer including a first repeating unit represented by Formula 1 and a second repeating unit represented by Formula 2.

When the positive electrode contains a copolymer containing the first repeating unit represented by the formula 1 and the second repeating unit represented by the formula 2 in the positive electrode, the lithium ion mobility is improved, the electrochemical stability is improved and the mechanical properties are improved. As a result, the electrochemical properties of the polymer can be improved.

The lithium battery may have an operating voltage of about 4 volts (V) or greater.

According to an embodiment, a cathode for a lithium battery includes a cathode active material and a copolymer including a first repeating unit represented by Formula 1 and a second repeating unit represented by Formula 2.

For example, the lithium battery according to an embodiment may be manufactured by using the following method.

First, the cathode may be prepared as follows. The cathode may be the cathode according to an embodiment or a comparative cathode.

For example, a cathode active material, a conducting agent, a binder, and a solvent may be mixed together to prepare a cathode active material composition. The cathode active material composition may be directly coated on a metallic current collector to prepare a cathode. The cathode active material composition may further include the copolymer including a first repeating unit represented by Formula 1 and a second repeating unit represented by Formula 2. In an embodiment, the cathode active material composition may be cast on a separate support to form a cathode active material film. This cathode active material film may then be separated from the support and laminated on a metallic current collector to prepare a cathode plate.

The cathode active material may include lithium cobalt oxide, lithium nickel cobalt manganese oxide, lithium nickel cobalt aluminum oxide, lithium iron phosphate, lithium manganese oxide, or a combination thereof. However, embodiments are not limited thereto. Any suitable cathode active material available in the art may be used.

For example, the cathode active material may be a compound represented by one of the following formulae: $Li_aA_{1-b}B'_bD_2$ (wherein $0.90 \leq a \leq 1.8$, and $0 \leq b \leq 0.5$); $Li_aE_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_b$-

$Co_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A may be nickel (Ni), cobalt (Co), manganese (Mn), or a combination thereof; B' may be aluminum (Al), Ni, Co, Mn, chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be Co, Mn, or a combination thereof; F' may be F, S, P, or a combination thereof; G may be Al, Cr, Mn, Fe, Mg, lanthanum (La), cerium (Ce), strontium (Sr), V, or a combination thereof; Q may be titanium (Ti), molybdenum (Mo), Mn, or a combination thereof; I' may be Cr, V, Fe, scandium (Sc), yttrium (Y), or a combination thereof; and J may be V, Cr, Mn, Co, Ni, copper (Cu), or a combination thereof.

The compounds listed above as cathode active materials may have a surface coating layer (hereinafter, also referred to as "coating layer"). In an embodiment, a mixture of a compound without a coating layer and a compound having a coating layer, the compounds being selected from the compounds listed above, may be used. In an embodiment, the coating layer may include an oxide, a hydroxide, an oxyhydroxide, an oxycarbonate, a hydroxycarbonate, or a combination thereof. In an embodiment, the compounds for the coating layer may be amorphous or crystalline. In an embodiment, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In an embodiment, the coating layer may be formed using any suitable method that does not adversely affect the physical properties of the cathode active material when a compound of the coating element is used. For example, the coating layer may be formed using a spray coating method, or a dipping method. The coating methods may be well understood by one of ordinary skill in the art, and thus a detailed description thereof will be omitted.

For example, the cathode active material may be $LiNiO_2$, $LiCoO_2$, $LiMn_xO_{2x}$ (wherein x=1 or 2), $LiNi_{1-x}Mn_xO_2$ (wherein $0<x<1$), $LiNi_{1-x-y}Co_xMn_yO_2$ (wherein $0 \leq x \leq 0.5$ and $0 \leq y \leq 0.5$), $LiFeO_2$, $V_2O_5$, TiS, or MoS.

Examples of the conducting agent for the cathode active material composition may include carbon black, graphite particles, natural graphite, artificial graphite, acetylene black, Ketjen black or carbon fibers; carbon nanotubes, or metal powders, metal fibers or metal tubes of copper, nickel, aluminum, silver, and so on; and conductive polymers such as polyphenylene derivatives. However, the conducting agent is not limited to the examples, and it is possible that the examples of the conducting agent include all materials that can be used as the conducting agent in the related art.

Examples of the binder may include vinylidene fluoride/hexafluoropropylene copolymers, polyvinylidene fluoride, polyimide, polyethylene, polyester, polyacrylonitrile, polymethylmethacrylate, polytetrafluoroethylene ("PTFE"), carboxymethyl cellulose/styrene-butadiene rubber ("SMC/SBR") copolymers, styrene butadiene rubber based polymers, and mixtures thereof.

Examples of the solvent may include N-methylpyrrolidone, acetone and water. However, the solvent is not limited to the examples, and it is possible that the examples of the solvent include all materials that can be used as the solvent in the related art.

Contents of the cathode active material, the conducting agent, the binder, and the solvent are as generally used in the manufacture of a lithium battery. One or more of the conducting agent, the binder, and the solvent may not be used according to the use and the structure of the lithium battery.

An anode may be obtained in almost the same manner as in the preparation process of the positive electrode, except that the anode active material is used instead of the cathode active material.

Examples of the anode active material may include a carbon-based material, silicon, a silicon oxide, a silicon-based alloy, a silicon-carbon-based material composite, tin, a tin-based alloy, a tin-carbon composite, a metal oxide, or a combination thereof.

The carbon-based material may be crystalline carbon, amorphous carbon, or a mixture thereof. Examples of the crystalline carbon may include graphite such as natural graphite or artificial graphite in non-shaped, disk-shaped, flake, spherical, or fibrous form, and examples of the amorphous carbon may include soft carbon (carbon sintered at low temperature), hard carbon, meso-phase pitch carbonization products, sintered cokes, graphene, carbon black, fullerene soot, carbon nanotubes, and carbon fibers. However, examples of the crystalline carbon and the amorphous carbon are not limited thereto, and any suitable material available in the art may be used as the crystalline carbon or the amorphous carbon.

The anode active material may include Si, $SiO_x$ (where, $0<x<2$, for example, $0.5<x<1.5$), Sn, $SnO_2$, a silicon-containing metal alloy, or a mixture thereof. A metal for forming the silicon alloy may include Al, Sn, Ag, Fe, Bi, Mg, Zn, In, Ge, Pb, Ti, or a combination thereof.

The anode active material may include a metal/semimetal alloyable with lithium, an alloy thereof, or an oxide thereof. For example, the metal/semimetal alloyable with lithium, the alloy thereof, or the oxide thereof may be Si, Sn, Al, Ge, Pb, Bi, Sb, a Si—Y' alloy (where, Y' is an alkali metal, an alkali earth metal, a Group 13 to 16 element, a transition metal, a rare earth element, or a combination thereof except for Si), a Sn—Y' alloy (where Y' is an alkali metal, an alkali earth metal, a Group 13 to 16 element, a transition metal, a rare earth element, or a combination thereof except for Sn), or $MnO_x$ ($0<x \leq 2$). Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. Examples of the oxide of the metal/semimetal alloyable with lithium are a lithium titanium oxide, a vanadium oxide, and a lithium vanadium oxide, $SnO_2$, and $SiO_x$ (where, $0<x<2$).

For example, the anode active material may include one or more elements that belong to Groups 13, 14, and 15.

For example, the anode active material may include Si, Ge, Sn, or a combination thereof.

Contents of the anode active material, the conducting agent, the binder, and the solvent are as generally used in the manufacture of a lithium battery. Next, a separator may be disposed between the cathode and the anode.

The separator is disposed between the positive electrode and the negative electrode. The separator is an insulating thin film having high ion permeability and mechanical strength.

The separator may have a pore diameter of about 0.01 μm to about 10 μm and a thickness of about 5 μm to about 20 μm. The separator may be sheet or non-woven fabric including an olefin-based polymer such as polypropylene, glass fibers, or polyethylene. When a solid polymer electrolyte is used as an electrolyte, the solid polymer electrolyte may also serve as a separator.

Examples of the olefin-based polymer as a material for forming the separator may include polyethylene, polypropylene, polyvinylidene, fluoride, or a multi-layer film having two or more layers including thereof. The separator may be a mixed multi-layer such as a two-layer separator of polyethylene/polypropylene, a three-layer separator of polyethylene/polypropylene/polyethylene, or a three-layer separator of polypropylene/polyethylene/polypropylene.

Next, an electrolyte may be prepared. The electrolyte may be in a liquid or gel state. The electrolyte may include the random copolymer according to any of the above-described embodiments.

For example, the electrolyte may be an organic liquid electrolyte. The organic liquid electrolyte may be prepared by dissolving a lithium salt in an organic solvent. The organic solvent may include an above-listed aprotic solvent. The lithium salt may be the same as that may be used for the electrolyte including the copolymer according to an embodiment.

In an embodiment, the electrolyte may be in a solid state. For example, the electrolyte may be boron oxide, lithium oxynitride, or the like. However, embodiments are not limited thereto. Any suitable solid electrolyte available in the art may be used. For example, a solid electrolyte may be formed on the anode by using, for example, sputtering.

Figure 9:
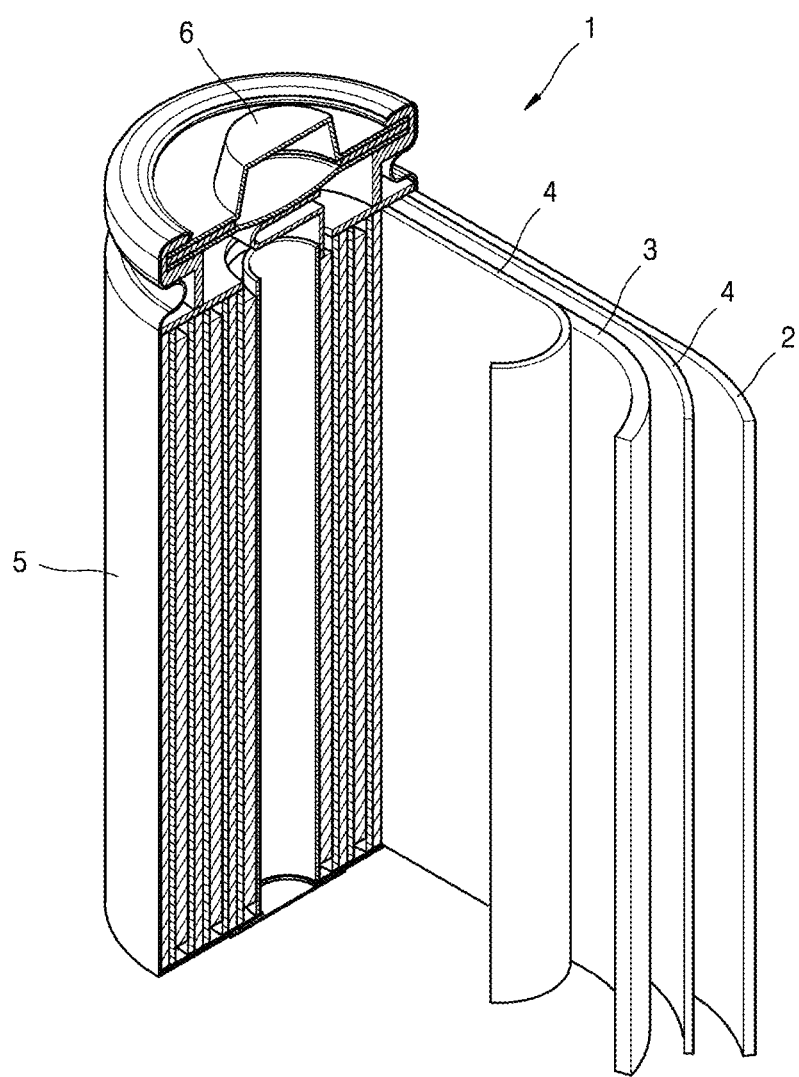
FIG. 9 is a schematic view of an embodiment of a lithium battery.

For example, referring to FIG. 9, a lithium battery 91 according to an embodiment may include a cathode 93, an anode 92, and a separator 4. The cathode 93, the anode 92, and the separator 94 may be wound or folded, and then accommodated in a battery case 95. Subsequently, an organic electrolyte solution may be injected into the battery case 95 and the battery case 95 may then be sealed with a cap assembly 96, thereby completing the manufacture of the lithium battery 91. The battery case 95 may have a cylindrical, rectangular or thin-film shape. For example, the lithium battery 91 may be a thin film-type battery.

For example, the lithium battery may be a lithium ion polymer battery. In a lithium ion polymer battery, the separator may be disposed between the cathode and the anode to form a battery assembly. Subsequently, the battery assembly may be stacked or wound in a bi-cell structure and impregnated with an organic electrolyte solution. Next, the resultant structure may be put into a pouch and hermetically sealed, thereby completing the manufacture of the lithium ion polymer battery.

In an embodiment, a plurality of battery assemblies may be stacked to form a battery pack, which may be used in any suitable device in which high capacity and high output are desirable, for example, in a laptop computer, a smart phone, or an electric vehicle.

The lithium battery may have improved thermal stability and battery characteristics, and thus may be used in an electric vehicle ("EV"), for example, in a hybrid vehicle such as a plug-in hybrid electric vehicle ("PHEV").

In an embodiment, the lithium battery may be a lithium air battery.

An example of manufacturing the lithium air battery is as follows.

First, an air electrode as a cathode is manufactured. For example, the air electrode may be manufactured as follows. As electrode materials, a conducting agent and a binder may be mixed together, and then an appropriate solvent may be added thereto to prepare an air electrode slurry. In an embodiment, the solvent may not be added. The air electrode slurry may be coated on a surface of a current collector and dried, optionally followed by press-molding against the current collector to improve the density of the electrode. The current collector may be a gas diffusion layer. In an embodiment, the air electrode slurry may be coated on a surface of a separator or a solid electrolyte membrane and dried, optionally followed by press-molding against the separator or solid electrolyte membrane to improve the density of the electrode.

The conducting agent included in the air electrode slurry may be porous. Any suitable material that has porosity and conductivity may be used without limitation. For example, a carbonaceous material having porosity may be used. Examples of the carbonaceous material may include carbon blacks, graphite, graphene, activated carbons, and carbon fibers.

A catalyst for oxidation/reduction of oxygen may be added to the air electrode slurry. Examples of the catalyst may include: precious metal-based catalysts such as platinum, gold, silver, palladium, ruthenium, rhodium, and osmium; oxide-based catalysts such as manganese oxide, iron oxide, cobalt oxide, and nickel oxide; and an organic metal-based catalyst such as cobalt phthalocyanine. However, embodiments are not limited thereto. Any suitable catalyst for oxidation/reduction of oxygen used in the art may be used.

In addition, the catalyst may be supported on a catalyst support. The catalyst support may be oxide, zeolite, clay-based mineral, carbon, or the like. The oxide may include at least one oxide of alumina, silica, zirconium oxide, and titanium dioxide. The oxide may be an oxide including cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), tungsten (W), or a combination thereof. Examples of the carbon may include carbon blacks such as Ketjen black, acetylene black, channel black, and lamp black; graphite such as natural graphite, artificial black, and expandable graphite; activated carbons; and carbon fibers. However, the carbon is not limited to these examples. Any suitable catalyst support used in the art may be used.

The air electrode slurry may include a binder. The binder may include a thermoplastic resin or a thermocurable resin. For example, the binder may be polyethylene, polypropylene, polytetrafluoroethylene ("PTFE"), polyvinylidene fluoride ("PVdF"), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, or an ethylene-acrylic acid copolymer, which may be used alone or in a combination thereof. However, embodiments are not limited thereto. Any suitable binders available in the art may be used.

A porous structure in a matrix or mesh form may be used as the current collector to facilitate diffusion of oxygen. A porous metal plate made of, for example, steel use stainless ("SUS"), nickel, or aluminum may also be used as the current collector. Materials for the current collector are not particularly limited, and any appropriate materials for current collectors available in the art may be used. The current collector may be coated with an anti-oxidation metal or alloy film to prevent formation of an oxide, e.g., oxidation).

Optionally, the air electrode slurry may include a catalyst for oxidation/reduction of oxygen, and a conducting material agent. Optionally, the air electrode slurry may include a lithium oxide.

Next, the composite membrane for a lithium battery as described above may be disposed between the air electrode and the anode. The lithium air battery further includes any suitable separator that may be used for a lithium battery.

In an embodiment, the lithium air battery further includes an oxygen blocking layer that is impervious to oxygen disposed between the air electrode and the anode. The lithium air battery including the oxygen blocking layer that is impervious to oxygen may not include the separator. The oxygen blocking layer, which may be a lithium ion conductive solid electrolyte membrane, may function as a protective layer for preventing direct reaction of the lithium metal anode with impurities such as oxygen present in the air electrode. An example of a material for the lithium ion conductive solid electrolyte membrane that is impervious to oxygen may include an inorganic material-containing lithium ion conductive glass, lithium ion conductive crystals (ceramic or glass-ceramic), or a combination thereof. However, embodiments are not limited thereto. Any suitable solid electrolyte membrane having lithium ion conductivity and being impervious to oxygen to protect the anode may be used. For example, the lithium ion conductive solid electrolyte membrane may include an oxide in view of chemical stability.

For example, the oxygen blocking layer including lithium ion conductive crystals may be a solid electrolyte membrane including $Li_{1+x+y}Al_x(Ti,Ge)_{2-x}Si_yP_{3-y}O_{12}$ (wherein $0 \leq x \leq 2$ and $0 \leq y \leq 3$), for example, $Li_{1.4}Ti_{1.6}Al_{0.4}P_3O_{12}$ ("LATP").

Next, an electrolyte may be injected between the air electrode and the anode. The electrolyte may be the same as used in a lithium battery. The electrolyte may be impregnated in the separator and the cathode (air electrode).

The lithium-air battery may have any of a variety of shapes, not limited to a specific shape, for example, may have a shape like a coin, a button, a sheet, a stack, a cylinder, a plane, or a horn. The lithium-air battery may be used in a large battery for electric vehicles.

The term "air" used herein is not limited to atmospheric air, and for convenience, may refer to a combination of gases including oxygen, or pure oxygen gas. This broad definition of "air" also applies to other terms, including "air battery" and "air electrode."

The copolymer according to an embodiment may be prepared as a random copolymer or a block copolymer according to a synthesis method used. For example, the block copolymer may be prepared by using anionic polymerization and a chain transfer agent ("CTA").

Hereinafter, a synthesis method of the copolymer according to an embodiment will be described in greater detail.

First, a copolymer represented by Formula 9 may be obtained by performing polymerization reaction between a first monomer represented by Formula 7 and a second monomer represented by Formula 8.

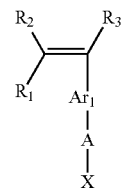

Formula 7

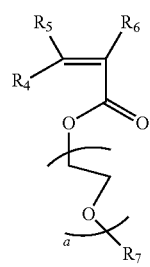

Formula 8

In Formula 7, $R_1$ to $R_3$, $Ar_1$, and A may be defined the same as those in Formula 1; and X may be a halogen atom. For example, the halogen atom for X may be Cl, Br, or I.

In Formula 8, $R_4$ to $R_7$, and a may be defined the same as those in Formula 2.

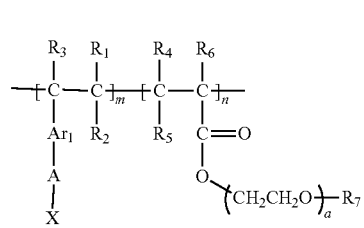

Formula 9

In Formula 9, X may be a halogen atom; $R_1$ to $R_3$, $Ar_1$, and A may be defined the same as those in Formula 1; $R_4$ to $R_7$, and a may be defined the same as those in Formula 2; and m and n, which indicate the above mole fractions, may each independently be a number from 0.1 to 0.99, and the sum of m and n may be 1.

Next, the copolymer represented by Formula 9 may be subjected to reaction with a compound represented by Formula 10 to change X at a terminal of the copolymer of Formula 9 into

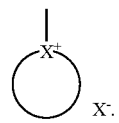

Subsequently, a compound including $Y^-$ may be added to the reaction product and reacted to obtain a target copolymer.

Formula 10

In Formula 10,

may be a 3-membered to 31-membered ring system including 2 to 30 carbon atoms; X may be S, N(R), or P(R'), wherein R and R' may be defined the same as those in Formula 1. The 3-membered to 31-membered ring system may be a monocyclic or multicyclic system, e.g., bicyclic, tricyclic, or more.

The compound represented by Formula 10 may be a compound including

and a 3-membered to 31-membered ring system including 2 to 30 carbon atoms, wherein X may be defined the same as that in Formula 1.

The compound represented by Formula 10 may be, for example, N-methylpyrrolidine, N-methylimidazole, or the like. The compound including $Y^-$ may be, for example, lithium bis(trifluoromethylsulfonyl)imide, lithium bis(fluorosulfonyl)imide, or the like.

The polymerization method used in preparing the copolymer according to an embodiment may be, for example, solution polymerization. However, embodiments are not limited thereto. Any suitable method used for preparing polymers in the art may be used. The polymerization temperature and polymerization time are also not specifically limited, and may be appropriately varied.

In the copolymer according to an embodiment, as described above,

in the first repeating unit of Formula 1 may originate from the following reactions: synthesizing a copolymer of Formula 9 and sequentially reacting the copolymer of Formula 9 with the compound represented by Formula 10 and then the compound including $Y^-$ such that X at a terminal of the copolymer of Formula 9 is changed into

thereby preparing a target copolymer according to an embodiment. In some embodiments, the copolymer according to an embodiment may be prepared by copolymerization between a first monomer represented by Formula 7a and a second monomer represented by Formula 8.

Formula 7a

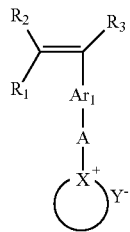

In Formula 7a, $R_1$ to $R_3$, $Ar_1$, A, $Y^-$, and

may be defined the same as those in Formula 1.

According to an embodiment, there is provided a copolymer including a first repeating unit represented by Formula 1 and second repeating unit represented by Formula 2 as described above. As described above, the copolymer may be a random copolymer.

Substituents in the formulae above may be defined as follows.

An alkyl group indicates a completely saturated, branched or unbranched (or a straight or linear) hydrocarbon group.

Non-limiting examples of the alkyl group may include a methyl group, an ethyl group, a n-propyl group, an isopropyl group, a n-butyl group, an isobutyl group, a sec-butyl group, a t-butyl group, an isopentyl group, a neopentyl group, a n-hexyl group, a 3-methylhexyl group, a 2,2-dimethylpentyl group, a 2,3-dimethylpentyl group, and a n-heptyl group.

At least one hydrogen atom of the alkyl group may be substituted with a halogen atom, a $C_1$-$C_{20}$ alkyl group substituted with a halogen atom (for example, $CF_3$, $CH_3CF_2$, $CH_2F$, $CCl_3$, and the like), a $C_1$-$C_{20}$ alkoxy group, a $C_2$-$C_{20}$ alkoxyalkyl group, a hydroxyl group (—OH), a nitro group (—$NO_2$), a cyano group (—CN), an amino group (—$NH_2$), an alkylamino group (RNH— wherein R is a $C_1$-$C_{10}$ alkyl group), a dialkylamino group ($R_2$N— wherein each R is the same or different $C_1$-$C_{10}$ alkyl group), an amidino group (—C(=NH)$NH_2$), a hydrazino group (—$NHNH_2$), a hydrazono group (=N—$NH_2$), a carbamoyl group (—C(O)$NH_2$), a carboxyl group or a salt thereof (—C(=O)OX wherein X is a hydrogen or a counterion), a sulfonyl group (—S(=O)$_2$—), a sulfamoyl group ($NH_2$—$SO_2$—), a sulfonic acid group or a salt thereof ((—$SO_3X_2$ wherein X is a hydrogen or a counterion), a phosphoric acid group or a salt thereof (—$PO_3X_2$ wherein X is a hydrogen or a counterion), a tosyl ($CH_3C_6H_4SO_2$—), a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_7$-$C_{20}$ arylalkyl group, a $C_4$-$C_{20}$ heteroaryl group, a $C_5$-$C_{20}$ heteroarylalkyl group, a $C_4$-$C_{20}$ heteroaryloxy group, a $C_5$-$C_{20}$ heteroaryloxyalkyl group, or a $C_5$-$C_{20}$ heteroarylalkyl group, provided that the substituted atom's normal valence is not exceeded.

An alkenyl group refers to an aliphatic hydrocarbon group including one or more double bonds. An alkynyl group refers to an aliphatic hydrocarbon group including one or more triple bonds. At least one hydrogen atom in the alkenyl or alkynyl group may be substituted with one of the substituents as described above in connection with the alkyl group. The indicated total number of carbon atoms for a group does not include any substituents if present A cycloalkyl group indicates an aliphatic hydrocarbon group including at least one ring and optionally an alkyl group. The alkyl group in the cycloalkyl group may be the same as described above. Non-limiting examples of the cycloalkyl group may include a cyclopropyl group, a cyclohexyl group, and a cyclopropylmethyl group. A heterocycloalkyl group indicates a cycloalkyl group including nitrogen (N), oxygen (O), phosphorous (P), sulfur (S), or a combination thereof in a ring of thereof. The cycloalkyl group in the heterocycloalkyl group may be the same as described above. At least one hydrogen atom in the cycloalkyl or heterocycloalkyl group may be substituted with one of the substituents as described above in connection with the alkyl group.

A halogen atom indicates fluorine, bromine, chlorine, iodine, and the like.

An alkoxy group indicates "alkyl-O—", wherein the alkyl group may be the same as described above. Non-limiting examples of the alkoxy group may include a methoxy group, an ethoxy group, a propoxy group, a 2-propoxy group, a butoxy group, a t-butoxy group, a pentyloxy group, and a hexyloxy group. At least one hydrogen atom in the alkoxy group may be substituted with one of the substituents as described above in connection with the alkyl group.

A cycloalkyloxy group indicates "cycloalkyl-O—", wherein the cycloalkyl group may be the same as described above. Non-limiting examples of the cycloalkoxy group may include a cyclopropoxy group, a cyclopropylmethyl group, and a cyclohexyloxy group. A heterocycloalkyloxy group indicates "heterocycloalkyl-O—", wherein the heterocycloalkyl group may be the same as described above. At least one hydrogen atom in the cycloalkyloxy group or the heterocycloalkyloxy group may be substituted with one of the substituents as described above in connection with the alkyl group.

The term "aryl" group, which is used alone or in combination, refers to an aromatic hydrocarbyl group containing at least one (e.g., 1, 2, 3, or 4) ring(s). The term "aryl" group includes a group having an aromatic ring fused to at least one cycloalkyl ring. Non-limiting examples of the aryl group may include a phenyl group, a naphthyl group, and a tetrahydronaphthyl group. At least one hydrogen atom in the aryl group may be substituted with one of the substituents as described above in connection with the alkyl group.

An arylalkyl group indicates "aryl-alkyl", wherein the alkyl group and the aryl group may be the same as described above.

An aryloxy group indicates "aryl-O—", wherein the aryl group may be the same as described above.

An arylthio group indicates "aryl group-S—", wherein the aryl group may be the same as described above.

A heteroaryl group indicates an aryl group as described above including nitrogen (N), oxygen (O), phosphorous (P), sulfur (S), or a combination thereof in a ring thereof, wherein the rest of the cyclic atoms are all carbon. The heteroaryl group may include, for example, one to five heteroatoms, and in an embodiment, may include a five- to ten-membered ring. In the heteroaryl group, S or N may be present in various oxidized forms.

Non-limiting examples of a monocyclic heteroaryl group may include a thienyl group, a furyl group, a pyrrolyl group, an imidazolyl group, a pyrazolyl group, a thiazolyl group, an isothiazolyl group, a 1,2,3-oxadiazolyl group, a 1,2,4-oxadiazolyl group, a 1,2,5-oxadiazolyl group, a 1,3,4-oxadiazolyl group, a 1,2,3-thiadiazolyl group, a 1,2,4-thiadiazolyl group, a 1,2,5-thiadiazolyl group, a 1,3,4-thiadiazolyl group, an isothiazol-3-yl group, an isothiazol-4-yl group, an isothiazol-5-yl group, an oxazol-2-yl group, an oxazol-4-yl group, an oxazol-5-yl group, an isoxazol-3-yl group, an isoxazol-4-yl group, an isoxazol-5-yl group, a 1,2,4-triazol-3-yl group, a 1,2,4-triazol-5-yl group, a 1,2,3-triazol-4-yl group, a 1,2,3-triazol-5-yl group, a tetrazolyl group, a pyrid-2-yl group, a pyrid-3-yl group, a 2-pyrazin-2-yl group, a pyrazin-4-yl group, a pyrazin-5-yl group, a 2-pyrimidin-2-yl group, a 4-pyrimidin-2-yl group, or a 5-pyrimidin-2-yl group.

The heteroaryl group may also include a heteroaromatic ring fused to at least one of an aryl group, a cycloaliphatic group, or a heterocyclic group.

Non-limiting examples of a bicyclic heteroaryl group may include an indolyl group, an isoindolyl group, an indazolyl group, an indolizinyl group, a purinyl group, a quinolizinyl group, a quinolinyl group, and an isoquinolinyl group. At least one hydrogen atom of the heteroaryl group may be substituted with one of the substituents as described above in connection with the alkyl group.

A heteroarylalkyl group indicates "heteroaryl-alkyl-", wherein the aryl group is the same as described above. Non-limiting examples of the heteroarylalkyl group may include a thiophen-2-ylmethylene group. A heteroaryloxy group indicates "heteroaryl-O—", wherein the heteroaryl group may be the same as described above. A heteroarylthio group indicates "heteroaryl-S—", wherein the heteroaryl group is the same as described above.

The terms "alkylene", "arylene", "heteroarylene", "cycloalkylene", and "heterocycloalkylene" indicate, respectively, the alkyl, aryl, heteroaryl, cycloalkyl, and heterocycloalkyl of which one hydrogen atom is removed.

It is to be understood that in some chemical formulae herein, a point of attachment may be indicated by a bond "—" with or without an asterisk (i.e., "—*").

EXAMPLES

An embodiment will now be described in detail with reference to the following examples. However, these examples are only for illustrative purposes and are not intended to limit the scope of an embodiment.

Preparation Example 1: Synthesis of Random Copolymer

After 10 grams (g) of 1-chloromethyl-4-vinylbenzene (available from Oakwood Chemical) and polyoxyethylene methacrylate (A) were added into a reactor, 0.075 g of azobisisobutyronitrile ("AIBN") was added thereto and then mixed with stirring at about 60° C. for about 15 hours for polymerization reaction. A molar ratio of 1-chloromethyl-4-vinylbenzene to polyoxyethylene methacrylate was about 4:1. After termination of the polymerization reaction, the solvent was removed by evaporation under reduced pressure, and the resultant was precipitated with n-hexane to obtain a random copolymer (B).

Reaction Scheme 1

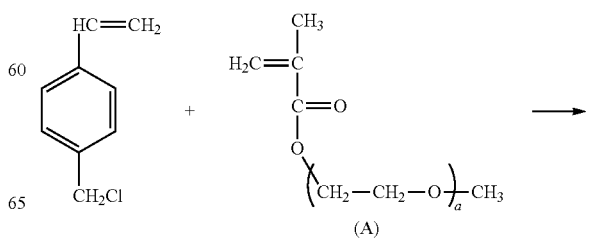

-continued

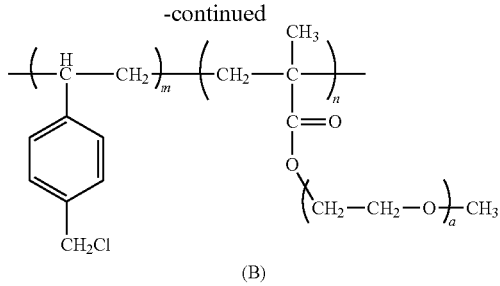

(B)

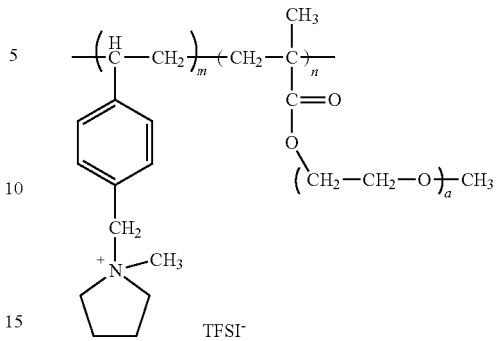

Formula 6e

In Reaction Scheme 1, m and n, which indicate mole fractions, were 0.8 and 0.2, respectively, and the sum of m and n was 1; and a was 10. A degree of polymerization of random copolymer of Formula 6a was adjusted to obtain the random copolymer having a weight average molecular weight of about 300,000 Dalton.

6.13 g of N-methylpyrrolidine (97%, available from Sigma-Aldrich) dissolved in 100 milliliters (mL) of dichloroethane was added to 100 mL of random copolymer (B), and then reacted about 70° C. for about 9 hours to prepare a random copolymer (C).

In Formula 6e, m and n, which indicate mole fractions, were 0.8 and 0.2, respectively, and the sum of m and n was 1; and a was 10. A degree of polymerization of the random polymer of Formula 6e was adjusted to obtain the random copolymer of Formula 6e having a weight average molecular weight of about 300,000 Dalton.

Preparation Example 2: Preparation of Random Copolymer

A random polymer of Formula 6e was prepared in the same manner as in Preparation Example 1, except that the molar ratio of 1-chloromethyl-4-vinylbenzene to polyoxyethylene methacrylate was changed to 1:1 in preparing the random copolymer (B). In Formula 6e, m and n were both 0.5.

Preparation Example 3: Preparation of Random Copolymer

A random polymer of Formula 6e was prepared in the same manner as in Preparation Example 1, except that the molar ratio of 1-chloromethyl-4-vinylbenzene to polyoxyethylene methacrylate was changed to 2:1 in preparing the random copolymer (B). In Formula 6e, m and n were 0.67 and 0.23, respectively.

Preparation Example 4: Synthesis of Random Copolymer

A random copolymer of Formula 6f was prepared in the same manner as in Preparation Example 1, except that lithium bis(fluorosulfonyl)imide ("LiFSI," available from PANAX) was used, instead of lithium bis(trifluoromethylsulfonyl)imide ("LiTFSI") added to the random copolymer (C).

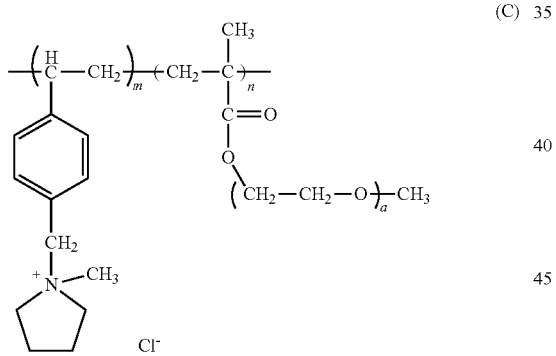

(C)

In the formula of random copolymer (C), m was 0.8, n was 0.2, and a was 10.

The random copolymer (C) was mixed with lithium bis(trifluoromethylsulfonyl)imide ("LiTFSI," available from PANAX) and acetone to prepare a random copolymer composition. The mixed ratio of random copolymer (C) and LiTFSI was in a molar ratio of about 1:1.2, and the amount of acetone was adjusted such that the amount of the random copolymer (C) was about 10 wt % based on a total weight of the random copolymer composition. The reaction mixture was stirred at room temperature (25° C.) for 6 hours to synthesize a random copolymer represented by Formula 6e in which TFSI⁻ anions were substituted for Cl⁻ anions of the random copolymer (C).

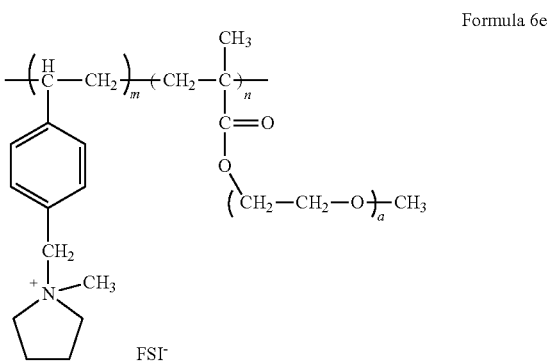

Formula 6e

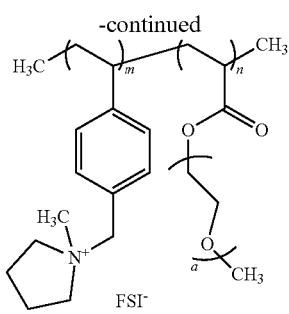

In Formula 6f, m and n, which indicate mole fractions were 0.8 and 0.2, respectively, and the sum of m and n was 1; and a was 10. A degree of polymerization a random copolymer of Formula 6f was adjusted to obtain the random copolymer of Formula 6f having a weight average molecular weight of about 300,000 Dalton.

Preparation Example 5: Preparation of Random Copolymer

A random polymer of Formula 6g was prepared in the same manner as in Preparation Example 1, except that a compound of Formula 11 was used, instead of chloromethyl-4-vinylbenzene.

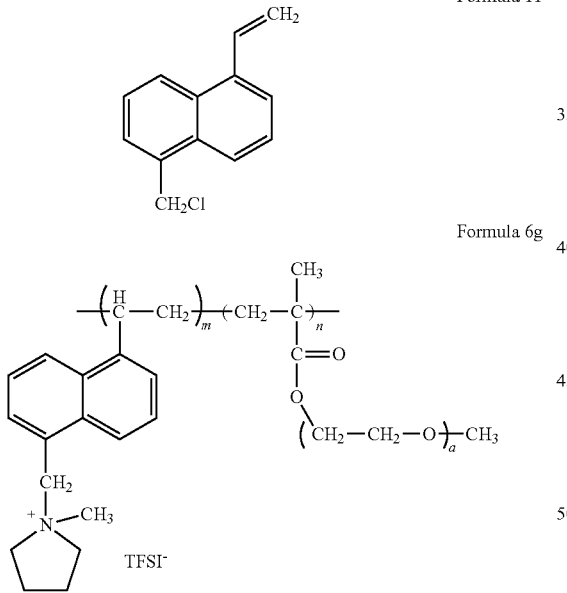

Formula 11

Formula 6g

In Formula 6g, m and n were 0.8 and 0.2, respectively, and a was 10. A degree of polymerization a random copolymer of Formula 6g was adjusted to obtain the random copolymer of Formula 6g having a weight average molecular weight of about 300,000 Dalton.

Comparative Preparation Example 1: Preparation of Random Copolymer 10 g of 1-chloromethyl-4-vinylbenzene (available from Oakwood chemical) was added into a reactor, and 6.13 g of N-methylpyrrolidine (97%, available from Sigma-Aldrich) dissolved in 100 ml of dichloroethane was added thereto, and the resulting solution was stirred at 70° C. for 9 hours to allow reaction, thereby obtaining an intermediate product in which a nitrogen atom of N-methyl-pyrrolidinium was bound to a methyl group of 1-chloromethyl-4-vinylbenzene.

The intermediate product was mixed with lithium bis (trifluoromethylsulfonyl)imide ("LiTFSI," available from PANAX) and acetone to prepare a composition. The mixed ratio of intermediate product and LiTFSI was in a molar ratio of about 1:1.2, and the amount of acetone was adjusted such that the amount of the intermediate product was about 10 wt % based on a total weight of the composition. The reaction mixture was stirred at room temperature (25° C.) for 6 hours to synthesize a vinylbenzyl-4-methyl-pyrrolidinium$^+$TFSI$^-$(mVBMPYR$^+$TFSI$^-$) monomer in which Cl$^-$ anions were substituted with TFSI$^-$ anions.

Subsequently, 20 g of styrene and 10.74 g of the synthesized monomer vinylbenzyl-4-methyl-pyrrolidinium$^+$TFSI$^-$ (mVBMPYR$^+$TFSI$^-$) were added in a molar ratio of 8:2 into a reactor, 0.75 g of azobisisobutyronitrile ("AIBN") as an initiator was added thereto, and the resulting solution was stirred at 60° C. for 15 hours to allow polymerization reaction. After termination of the polymerization reaction, the solvent was removed using a rotary evaporator, and the resultant was precipitated with methanol to recover a random copolymer (D) as a product of the polymerization.

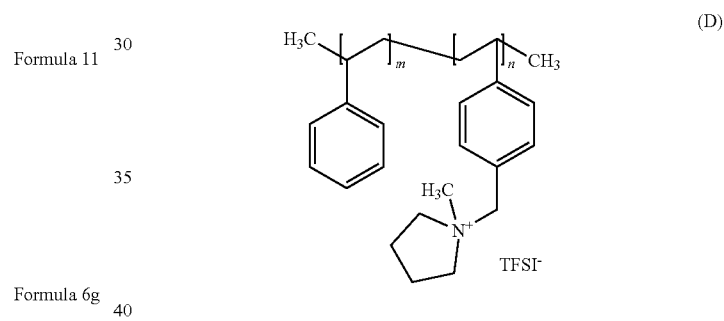

(D)

In the formula of the random copolymer (D), m and n were 0.8 and 0.2, respectively. A degree of polymerization of a random copolymer (D) was adjusted to obtain the random copolymer (D) having a weight average molecular weight of about 37,000 Dalton. The random copolymer (D) had a polydispersity index ("PDI") of 1.55.

Example 1: Manufacture of Lithium Battery (Li/Li Symmetric Cell)

0.4 g of the random copolymer of Formula 6e prepared in Preparation Example 1 was dissolved in a mixed solvent (5:5 by volume ratio) of dimethylformamide ("DMF") and tetrahydrofuran ("THF") to obtain a polymer solution. Then, 0.2 g of LiTFSI as a lithium salt was added thereto and dissolved, and the resulting polymer solution was coated on a lithium foil having a thickness of about 20 micrometers (μm) by using a doctor blade, dried in a dry chamber at room temperature (25° C.) for about 2 days, and then further vacuum-dried at about 60° C. overnight to form a lithium anode having a solvent-free, 5 μm-thick protection layer including the random copolymer. A lithium anode was further stacked on a surface of the protection layer, thereby manufacturing a Li/Li symmetric cell. The protection layer including the random copolymer as a polymeric ionic liquid and the lithium salt may serve served as an electrolyte.

Examples 2 and 3: Manufacture of Lithium Battery (Li/Li Symmetric Cell)

A Li/Li symmetric cell was manufactured in the same manner as in Example 1, except that the random copolymers of Formula 6e of Preparation Examples 2 and 3 were used, respectively, instead of the random copolymer of Formula 6e prepared in Preparation Example 1.

Example 4: Manufacture of Lithium Battery (Full Cell)

After forming a 5 μm-thick protection layer including the random copolymer (Preparation Example 1) on a lithium anode in the same manner as in Example 1, a cathode was stacked on a surface of the protection layer to manufacture a full cell.

The cathode was formed as follows. $LiN_{0.6}Co_{0.2}Mn_{0.2}O_2$ (3.5 milliampere hour per square centimeter ($mAh/cm^2$), ("LiNCM,") available from Samsung SDI), a conducting agent (Super-P; Timcal Ltd.), the random copolymer of Formula 6e obtained in Preparation Example 1, and N-methylpyrrolidone were mixed together to obtain a cathode composition. In the cathode composition, a mixed weight ratio of LiNCM, the conducting agent, and the random copolymer of Formula 6e obtained in Preparation Example 1 was about 70:5:25. The cathode composition was coated on an aluminum foil (having a thickness of about 15 μm), dried at about 25° C., and then vacuum-dried at about 110° C., thereby manufacturing a full cell.

Examples 5 and 6: Manufacture of Lithium Battery (Full Cell)

Full cells were manufactured in the same manner as in Example 4, except that the random copolymer of Preparation Example 4 and the random copolymer of Preparation Example 5 were used, respectively, instead of the random copolymer of Preparation Example 1.

Comparative Example 1: Manufacture of Lithium Battery (Li/Li Symmetric Cell)

A Li/Li symmetric cell was manufactured in the same manner as in Example 1, except that a polyoxyethylene methacrylate ("POEM") layer was formed using POEM, instead of using the random copolymer of Formula 6e of Preparation Example 1. Due to the difficulty of forming the POEM layer as a free-standing film, a short-prevention layer having an O-ring shape and a thickness of about 15 μm was used to form the POEM layer. As the short-prevention layer, a Celgard separator having a thickness of about 12 μm was used. The POEM layer was found to have so poor mechanical properties that it cannot be solely used as a membrane.

Comparative Example 2: Manufacture of Lithium Battery (Li/Li Symmetric Cell)

A Li/Li symmetric cell was manufactured in the same manner as in Example 1, except that the random copolymer (D) prepared in Comparative Preparation Example 1 was used, instead of the random copolymer of Formula 6e of Preparation Example 1.

Comparative Example 3: Manufacture of Lithium Battery (Li/Li Symmetric Cell)

A Li/Li symmetric cell was manufactured in the same manner as in Example 1, except that polyethylene oxide (having a weight average molecular weight of about 600,000 Da) was used, instead of the random copolymer of Preparation Example 1.

Comparative Example 4: Manufacture of Lithium Battery (Full Cell)

A full cell was manufactured in the same manner as in Example 4, except that an anode protection layer prepared as below was used.

The anode protection layer was formed in the same manner in Example 1, except that the random copolymer (D) of Comparative Preparation Example 1 was used, instead of the random copolymer of Preparation Example 1.

Evaluation Example 1: Fourier-Transform Infrared ("FT-IR") Spectrometry

Figure 2:
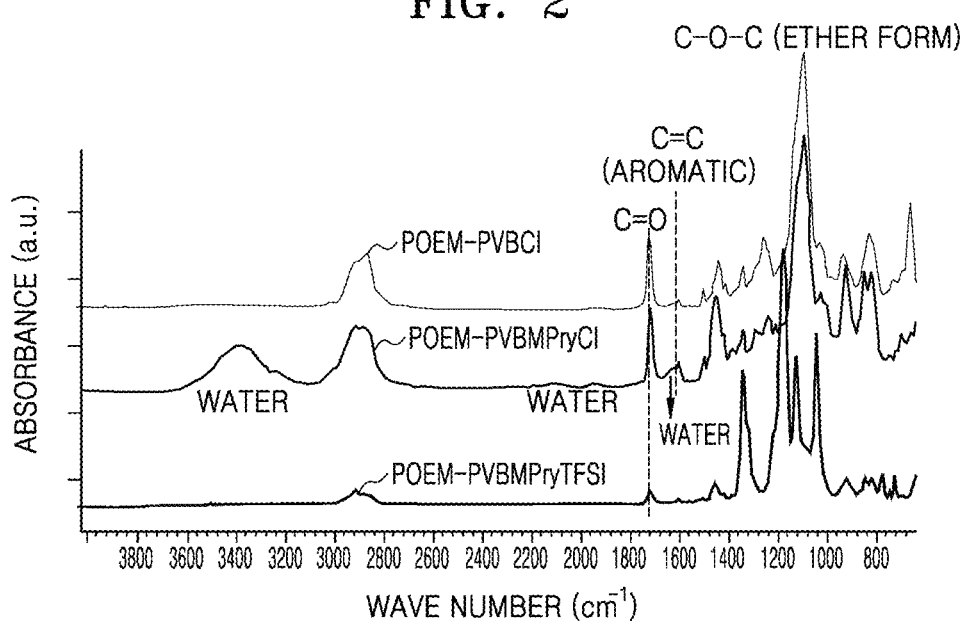
FIG. 2 is a graph of absorbance (arbitrary units, a.u.) versus wave number ($cm^{-1}$) which shows Fourier-Transform infrared ("FT-IR") spectra of random polymers prepared in Preparation Example 1.

The random copolymer of Formula 6e, and the random copolymers (B) and (C) prepared in Preparation Example 1 were analyzed by Fourier-Transform Infrared ("FT-IR") spectroscopy. The results are shown in FIG. 2. In FIG. 2, polyoxyethylene methacrylate-poly(vinylbenzyl chloride) copolymer ("POEM-PVBCl"), polyoxyethylene methacrylate-poly(vinylbenzyl-methyl-pyrrolidinium chloride) copolymer ("POEM-PVBMPryCl"), and polyoxyethylene methacrylate-poly(vinylbenzyl-methyl-pyrrolidinium bis (trifluoromethanesulfonyl)imide) copolymer ("POEM-PVBMPryTFSI") indicate the random copolymer (B), the random copolymer (C), and the random copolymer of Formula 6e, respectively.

Referring to FIG. 2, a peak corresponding to C═C bond and C—H (sp2 orbital) bond derived from a vinyl group of polystyrene was not observed. In addition, a peak corresponding to C—Cl bond of 1-chloromethyl-4-vinylbenzene was also not observed. Thus, it was confirmed that the random copolymer was synthesized through complete polymerization.

Evaluation Example 2: Nuclear Magnetic Resonance ("NMR") Spectroscopy

Figure 3A:
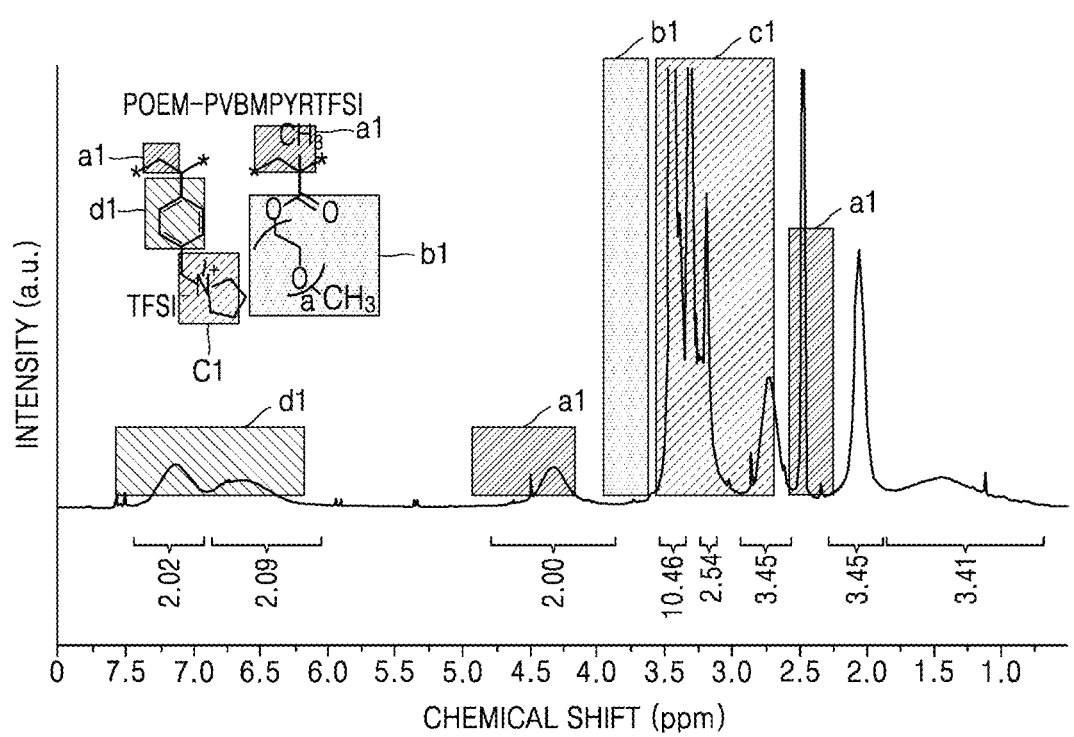
FIG. 3A is a graph of intensity (arbitrary units, a.u.) versus chemical shift (parts per million, ppm) which shows nuclear magnetic resonance ("NMR") spectra of a random copolymer of Formula 6a prepared in Preparation Example 1.
Figure 3B:
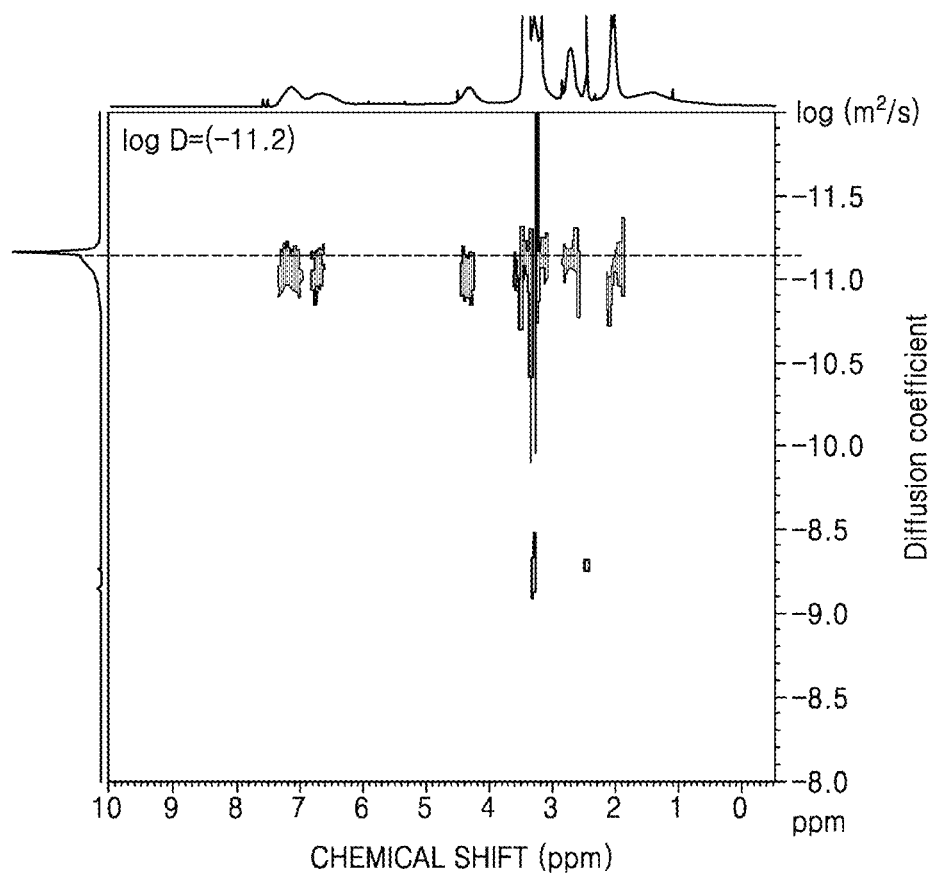
FIG. 3B is a graph of intensity (arbitrary units, a.u.) versus chemical shift (parts per million, ppm) which shows two-dimensional diffusion-ordered spectroscopy ("2D-DOSY") NMR spectra of the random polymer of Formula 6a prepared in Preparation Example 1.

The random copolymer of Formula 6e obtained in Preparation Example 1 was analyzed by NMR spectroscopy. The results are shown in FIG. 3A. Two-dimensional diffusion ordered spectroscopy ("2D-DOSY") NMR spectra of the random copolymer of Formula 6e are shown in FIG. 3B.

Referring to FIG. 3A, it was possible to identify structures of the monomers constituting the random copolymer. It was also found that the random copolymer had a heterogeneous copolymer molecular structure. Referring to FIG. 3B, a copolymer form of the random copolymer was confirmed. Through this NMR analysis, a mixed ratio of the first and second repeating units constituting the random copolymer was identified.

Evaluation Example 3: Electrochemical Stability Evaluation

A Li/Al symmetric cell was manufactured by replacing one of the lithium anodes in the Li/Li symmetric cell of Example 1 with a bare aluminum foil (having a thickness of about 10 μm). In the Li/Al symmetric cell, the lithium anode was used as a reference electrode, while the aluminum foil protected with a protection layer including the random copolymer was used as a working electrode.

Figure 4A:
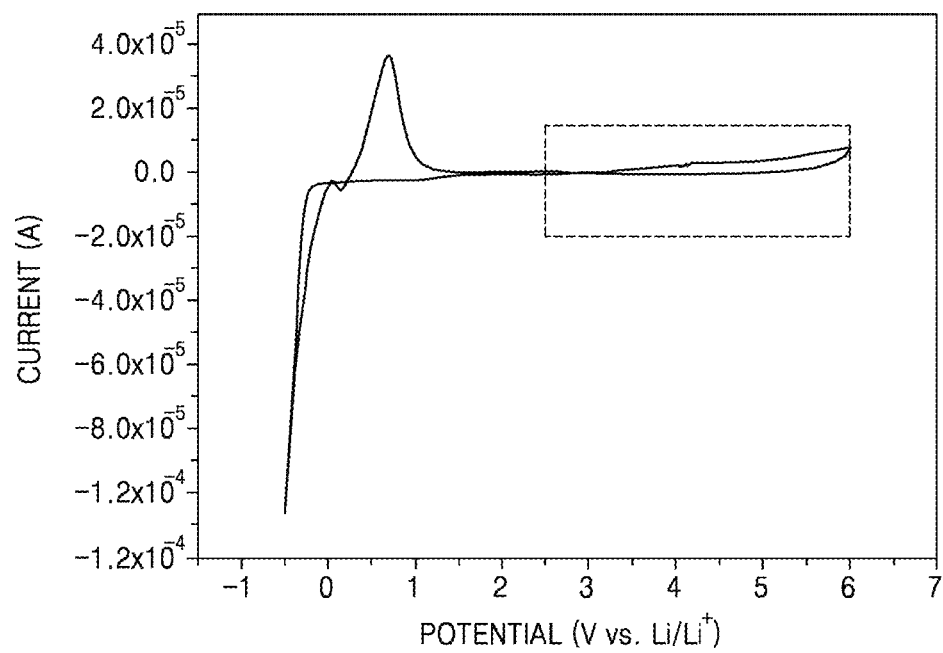
FIGS. 4A and 4B are graphs of current (amperes, A) versus potential (Volts versus $Li/Li^+$ (V vs. $Li/Li^+$)) showing the results of cyclic voltammetry analysis of the anode the a lithium battery manufactured in Example 1.
Figure 4B:
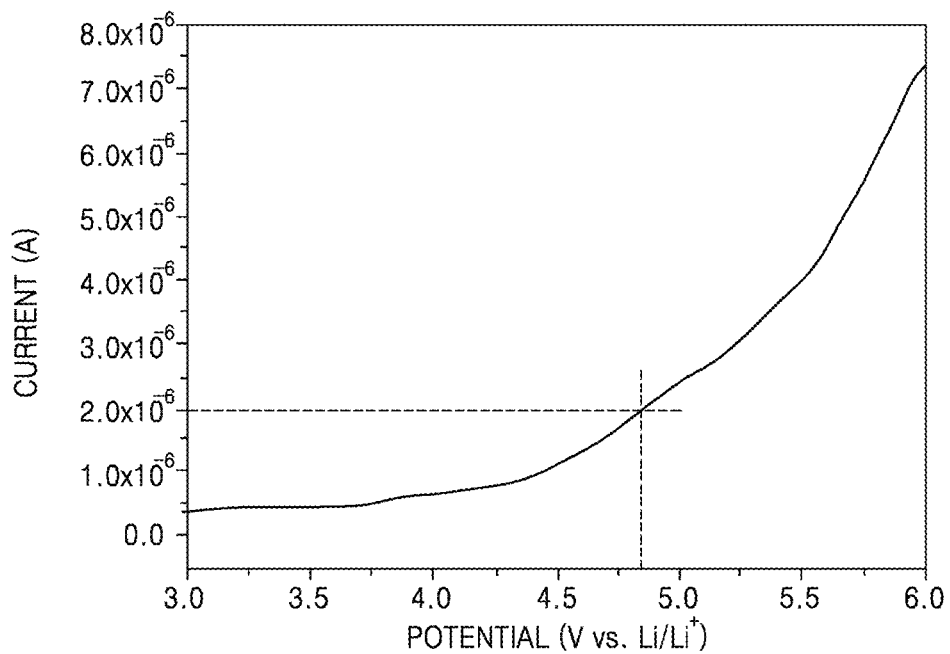

The Li/Al cell was scanned by cyclic voltammetry at a rate of 5 mV/sec with a voltage from −0.5 V to 2.0 V with respect to Li metal to determine whether a reduction current caused from a side reaction of the protection layer was generated. This experiment was conducted using a potentiometer (1287 Electrochemical Interface ("ECI"), available from Solartron analytical). The cyclic voltammetry measurement results are shown in FIGS. 4A and 4B.

Like a bare metal electrode, the protected aluminum electrode generated only a reduction current caused by lithium ion deposition at a voltage of 0 V or less with respect to Li metal and an oxidation current caused by dissolution of reduced lithium at a voltage of 0 V or greater with respect to Li metal, but not a reduction current caused by a side reaction of the protection layer.

The protection layer was found to be electrochemically stable at up to −0.5 V with respect to lithium metal. The protection layer was also found to be electrochemically stable at a high voltage with respect to lithium metal. These results indicate that the electrolyte had electrochemical stability at an operating voltage range of the lithium battery.

Evaluation Example 4: Impedance Measurement

Changes in impedance with respect to the frequency of an alternating current voltage in the lithium batteries of Comparative Examples 2 and 3 and Example 1 were measured at 25° C. using an impedance analyzer (Solartron 1260A impedance/gain-phase analyzer) at an amplitude of about 10 millivolts (mV) in a frequency range of about 0.1 hertz (Hz) to 1 megahertz (MHz).

Figure 5A:
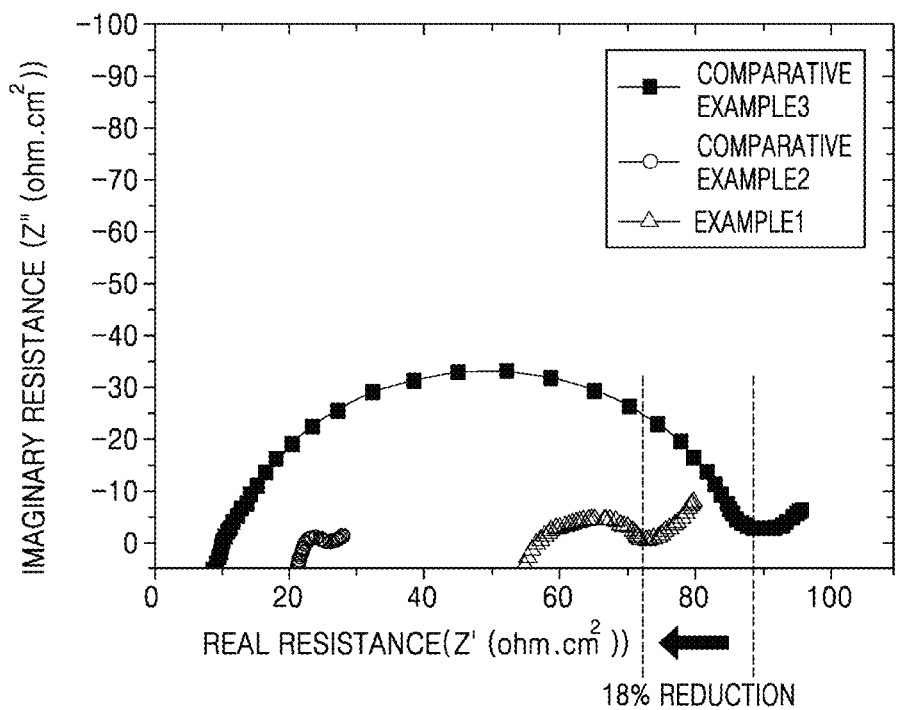
FIG. 5A is a graph of imaginary resistance (Z", ohms-square centimeters, $\Omega \cdot cm^2$) versus real resistance (Z', ohms-square centimeters, $\Omega \cdot cm^2$) which shows the results of impedance measurement of symmetrical cells prepared in Example 1, Comparative Example 2, and Comparative Example 3.
Figure 5B:
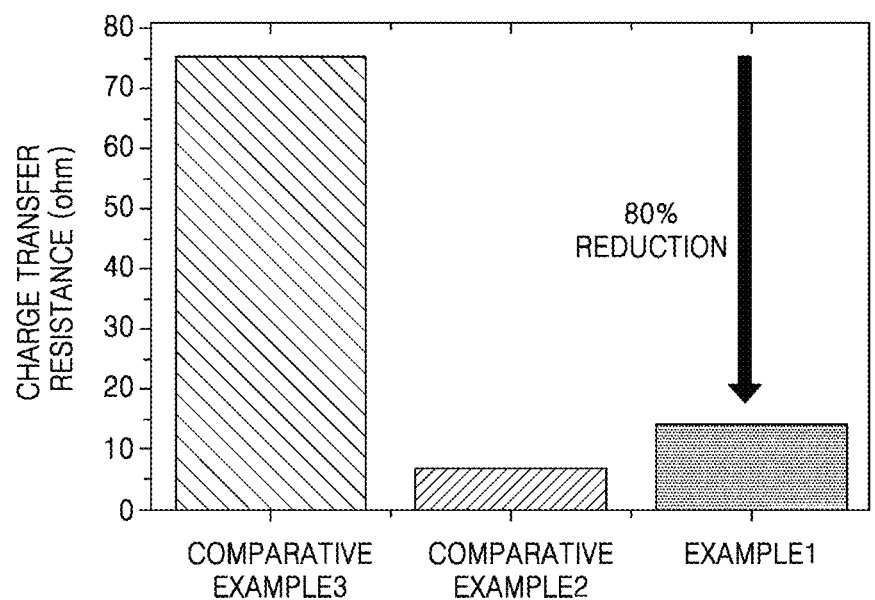
FIG. 5B is a graph of charge transfer resistance (ohms) showing the characteristics of the lithium batteries of Example 1 and Comparative Examples 2 and 3.

Nyquist plots obtained as results of the impedance measurement of each lithium battery are shown in FIG. 5A. A charge transfer resistance in each lithium battery is shown in FIG. 5B. The charge transfer resistance is related to interfacial resistance in the lithium batteries.

Referring to FIG. 5A, a difference between the left x-intercept and the right x-intercept of the semicircle represents the interfacial resistance at the electrode. The lithium battery of Example 1 was found to have an area specific resistance (ASR) about 18% less than the lithium battery of Comparative Example 3.

Referring to FIG. 5B, the lithium battery of Example 1 was found to have a charge transfer resistance about 80% less than that of the lithium battery of Comparative Example 3.

Evaluation Example 5: Lithium Transfer Probability Evaluation

Figure 6A:
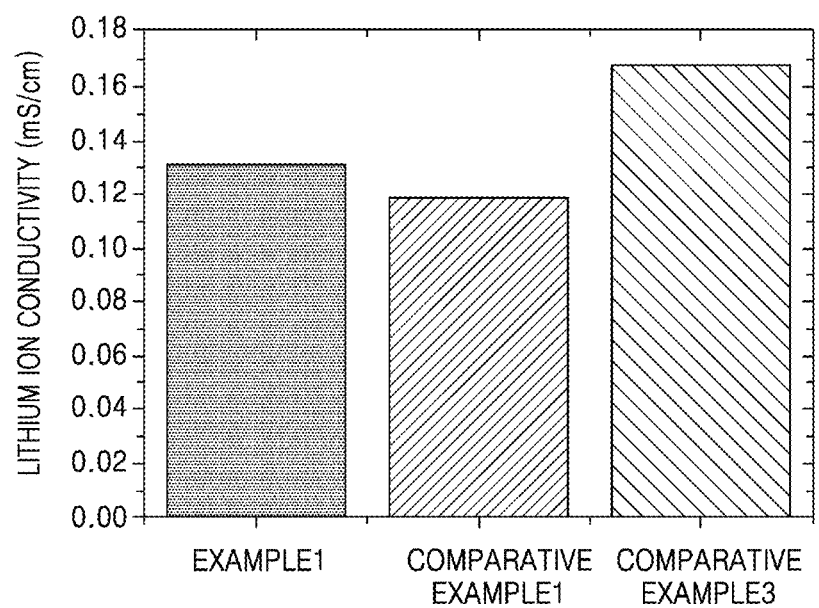
FIG. 6A is a graph of lithium ion conductivity (millisiemens per centimeter, mS/cm) of the lithium batteries of Example 1, Comparative Example 1, and Comparative Example 3.
Figure 6B:
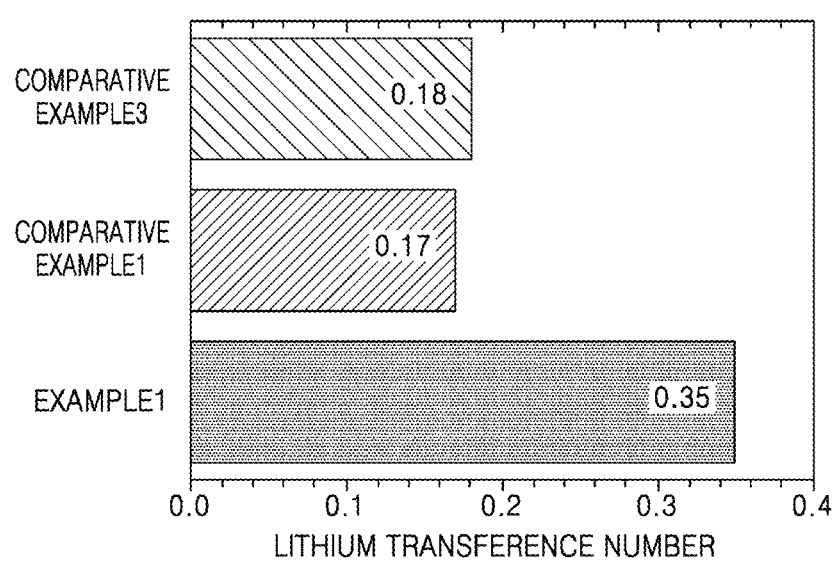
FIG. 6B is a graph of lithium ion mobility (mS/cm) of the lithium batteries of Example 1, Comparative Example 1, and Comparative Example 3.
Figure 6C:
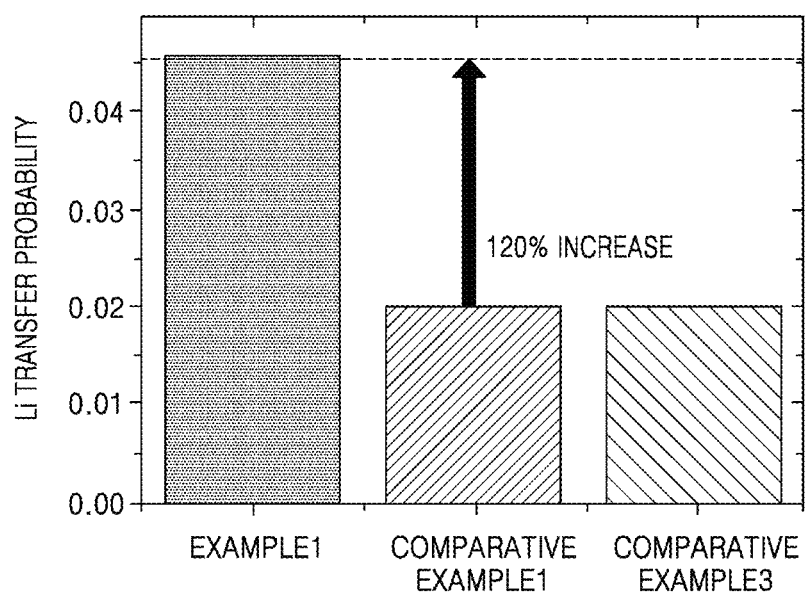
FIG. 6C is a graph of lithium (Li) transfer probability of the lithium batteries of Example 1, Comparative Example 1, and Comparative Example 3.

A lithium ion conductivity (lithium transference number), lithium ion mobility, and lithium transfer probability of each of the lithium batteries of Example 1 and Comparative Examples 1 and 3 were obtained. The results are shown in FIGS. 6A to 6C. The lithium transfer probability, e.g., lithium ionic potential, is defined using Equation 1.

Lithium ionic potential=Lithium ion conductivity× Lithium ion mobility   Equation 1

Referring to FIG. 6A, the lithium battery of Example 1 was found to have a greater lithium ion conductivity compared to the lithium batteries of Comparative Examples 1 and 3. Referring to FIG. 6B, the lithium battery of Example 1 was found to have about 100% greater lithium ion mobility compared to the lithium battery of Comparative Example 3, and an even greater lithium ion mobility than that of the lithium battery of Comparative Example 1. Referring to FIG. 6C, the lithium battery of Example 1 was found to have about 120% greater lithium transfer probability compared to the lithium batteries of Comparative Examples 1 and 3.

Evaluation Example 6: Charge and Discharge Characteristics

Figure 7A:
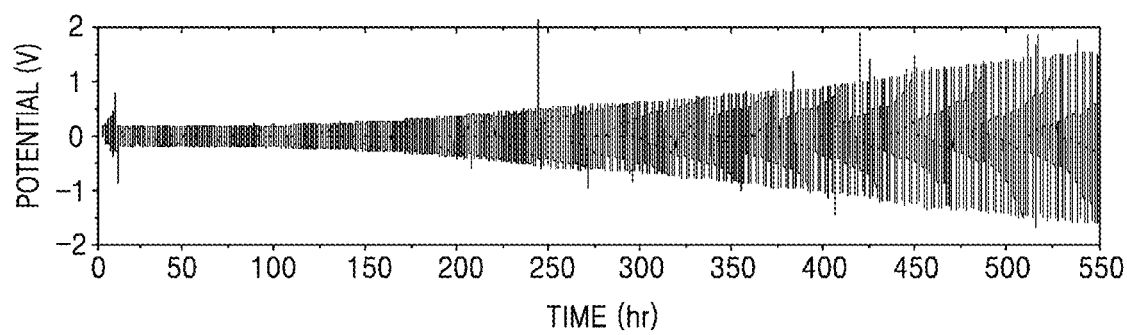
FIG. 7A is a graph of potential (V) versus time (hours (hr)) which shows the results of electrochemical stability evaluation of a lithium battery (Li/Li symmetric cell) manufactured in Example 1.

Electrochemical stabilities of the lithium batteries (Li/Li symmetric cells) of Example 1 and Comparative Example 2 were evaluated while each lithium battery was charged and discharged at a charge/discharge rate of about 0.2 milliampere per square centimeter (mA/cm$^2$) for about 1 hour to evaluate deposition and dissolution behaviors of lithium ions in the lithium battery. The electrochemical stability evaluation results of the lithium batteries of Example 1 and Comparative Example 2 are shown in FIGS. 7A and 7B, respectively.

Figure 7B:
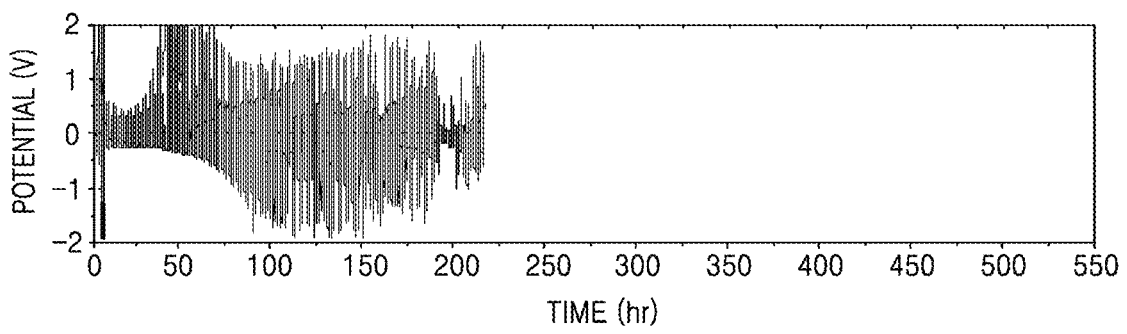
FIG. 7B is a graph of potential (V) versus time (hours, hr) which shows the results of electrochemical stability evaluation of a lithium battery (Li/Li symmetric cell) manufactured in Comparative Example 2.

Referring to FIG. 7B, the lithium battery of Comparative Example 2 using the copolymer including polystyrene ("PS") and polymerized ionic liquid ("PIL") and having improved mechanical strength than POEM was found to have an over-potential of about 1 V and undergo, e.g., experience, a short-circuit after 120 cycles. On the other hand, referring to FIG. 7A, the lithium battery of Example 1 was found to maintain a relatively low over-potential and exhibit stable deposition/dissolution behaviors up to 270 cycles or more and an improvement in cycle characteristics of about 125%.

Evaluation Example 7: Charge and Discharge Characteristics

Figure 8A:
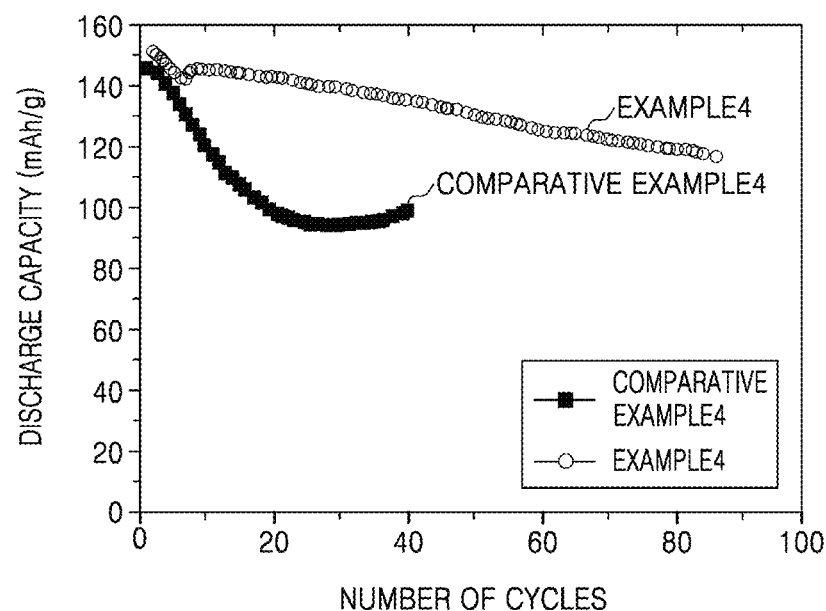
FIG. 8A is a graph of discharge capacity (milliampere hours per gram (mAh/g)) versus number of cycles which shows lifetime (charge and discharge) characteristics of lithium batteries of Example 4 and Comparative Example 4.
Figure 8B:
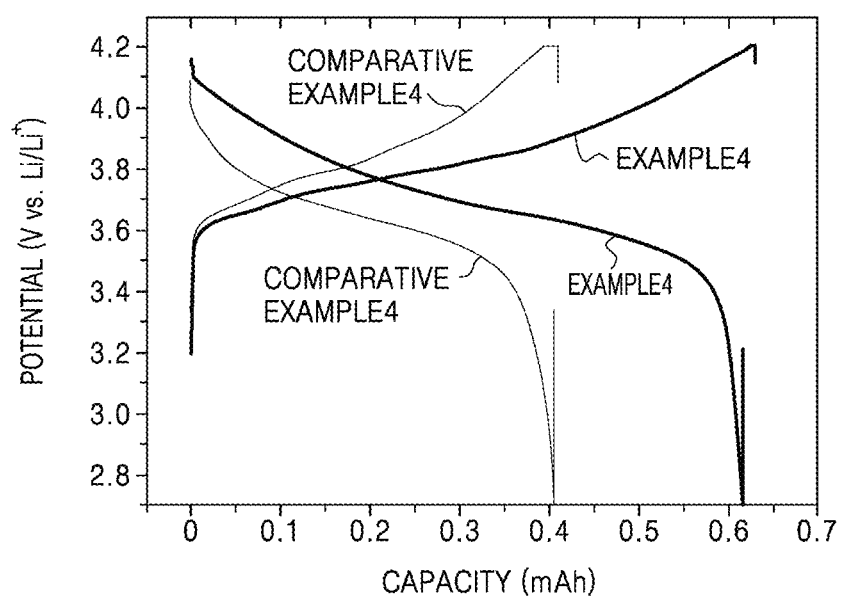
FIG. 8B is a graph of potential (V vs. Li/Li$^+$) versus capacity (milliampere hours (mAh)) for the lithium batteries of Example 4 and Comparative Example 4.

Each of the lithium batteries of Example 4 and Comparative Example 4 was charged at a constant current of 0.7 C rate at 25° C. in a voltage range of from 3.0 V to 4.4 V with respect to Li metal, charged at a constant voltage of 4.2 V until the current decreased to 0.025 C, and then discharged at a constant current of 0.5 C. Subsequently, this charging and discharging cycle was repeated 80 times. The experiment results are shown in FIGS. 8A and 8B. A capacity retention rate was calculated using Equation 2.

Capacity retention (%)=[Discharge capacity at $80^{th}$ cycle/Discharge capacity at $1^{st}$ cycle]×100%   Equation 2

Referring to FIGS. 8A and 8B, the lithium battery of Example 4 was found to have about 115% improved cycle characteristics, compared to the lithium battery of Comparative Example 4. When the copolymer including POEM as a lithium-ion conductive polymer and PIL capable of improving lithium ion mobility and mechanical properties was used as a polymer electrolyte of a lithium battery using a lithium metal anode, the lithium battery of Example 4 was found to have improved electrochemical performance.

Cycle characteristics of the lithium batteries of Examples 5 and 6 were evaluated in the same manner as applied above to the lithium battery of Example 4. As a result, the lithium batteries of Examples 5 and 6 were found to have similar cycle characteristics to those of the lithium battery of Example 4.

Evaluation Example 8: Determination of Free-Standing Ability of Composite Membrane Whether the composite membranes of Examples 1 to 4 and the composite membranes of Comparative Example 1 to 4 had a free-standing form at about 25° C. was determined.

The composite membranes prepared in Examples 1 to 4 were found to have a free-standing form at about 25° C., whereas the composite membrane of Comparative Example 1 had poor film formability and was unable to form a free-standing film. The composite membranes of Comparative Examples 2 and 4 had a free-standing form, but a poor lithium ion conductivity of about 0.005 millisiemens/centimeter (mS/cm), and were difficult to apply in practice. The composite membrane of Comparative Example 3 had good lithium ion conductivity, but not a free-standing form, like the composite membrane of Comparative Example 1.

As described above, according to an embodiment, using an anode including a novel random copolymer, a lithium battery may have improved electrochemical stability, high-rate characteristics, and lifespan characteristics due to inhibited dendrite formation on a surface of the anode.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite membrane for a lithium battery, the composite membrane comprising:

a random copolymer of a first repeating unit represented by Formula 1 and a second repeating unit represented by Formula 2

Formula 1

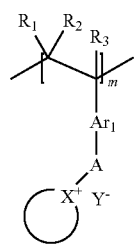

wherein, in Formula 1, $Ar_1$ is a substituted or unsubstituted C6-C30 arylene group or a substituted or unsubstituted C6-C30 heteroarylene group, $R_1$, $R_2$, and $R_3$ are each independently hydrogen, an unsubstituted or substituted C1-C20 alkyl group, an unsubstituted or substituted C6-C20 aryl group, or an unsubstituted or substituted C3-C30 heteroaryl group, A is a chemical bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group,

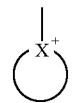

is a 3-membered to 31-membered ring system comprising 2 to 30 carbon atoms,

X is S, N, N(R), or P(R'), wherein R and R' are each independently hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 cycloalkyl group, an unsubstituted or substituted C2-C30 alkenyl group, an unsubstituted or substituted C3-C30 heteroaryloxy group, an unsubstituted or substituted C3-C30 heterocycloalkyl group, or an unsubstituted or substituted C3-C30 alkynyl group, and $Y^-$ is an anion, Formula 2

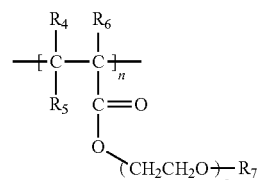

wherein, in Formula 2, $R_4$, $R_5$, and $R_6$ are each independently hydrogen, an unsubstituted or substituted C1-C20 alkyl group, an unsubstituted or substituted C6-C20 aryl group, or an unsubstituted or substituted C3-C30 heteroaryl group, each $R_7$ is independently hydrogen, an unsubstituted or substituted C1-C20 alkyl group, or unsubstituted or substituted C6-C20 aryl group, and a is an integer of 1 to 10, and in Formulae 1 and 2, m and n are mole fractions of the first repeating unit represented by Formula 1 and the second repeating unit represented by Formula 2, respectively, wherein the sum of m and n is 1, and m and n are each independently greater than 0 and less than 1.

2. The composite membrane of claim 1, wherein, in Formula 1, $Ar_1$ comprises a phenylene group, a biphenylene group, a naphthalenylene group, a phenanthrenylene group, a triphenylenylene group, an anthracenylene group, a fluorenylene group, or a carbazolylene group.

3. The composite membrane of claim 1, wherein, in Formula 1, $Ar_1$ comprises a group represented by Formula 3-1, Formula 3-2, Formula 3-3, Formula 3-3, or Formula 3-4:

Formula 3-1

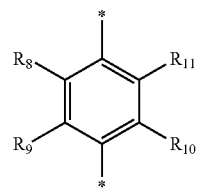

Formula 3-2
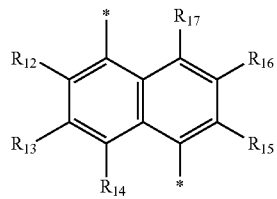

Formual 3-3
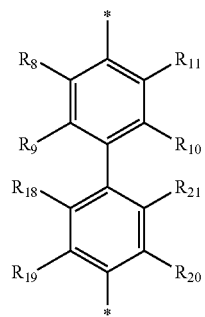

Formula 3-4
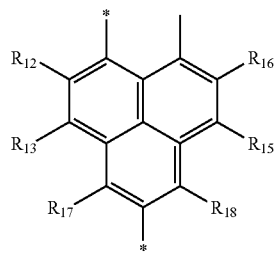

Formula 3-5
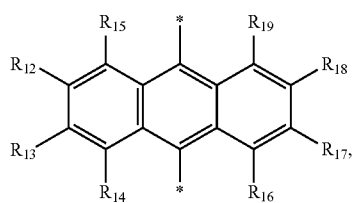

wherein in Formula 3-1, Formula 3-2, Formula 3-3, Formula 3-4, and Formula 3-5, * indicates a point of attachment, and $R_{11}$ to $R_{19}$ are each independently hydrogen, an unsubstituted or substituted C1-C20 alkyl group, an unsubstituted or substituted C6-C20 aryl group, or an unsubstituted or substituted C3-C30 heteroaryl group.

4. The composite membrane of claim 1, wherein, in Formula 1,

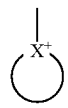

comprises a group represented by Formula 4-1, Formula 4-2, Formula 4-3, Formula 4-4, or Formula 4a:

Formula 4-1
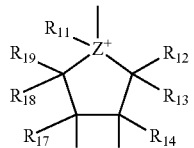

Formula 4-2
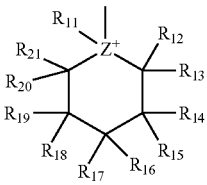

Formula 4-3
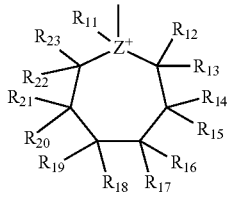

Formula 4-4
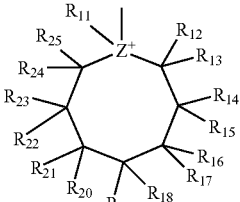

wherein, in Formula 4-1, Formula 4-2, Formula 4-3, Formula 4-4, Z is sulfur, nitrogen, or phosphorous, and $R_{11}$ to $R_{25}$ are each independently hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group, wherein $R_{11}$ is absent if Z is S Formula 4a
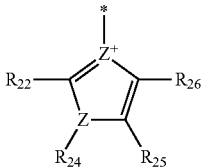

wherein, in Formula 4a, $R_{22}$ to $R_{26}$ are defined the same as $R_{11}$ to $R_{25}$ in Formula 4-1, Formula 4-2, Formula 4-3, and Formula 4-4, and Z is N.

5. The composite membrane of claim 1, wherein

in Formula 1 comprises a group represented by Formula 5-1 or Formula 5-2, and $Y^-$ in Formula 1 comprises $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^{2-}$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof

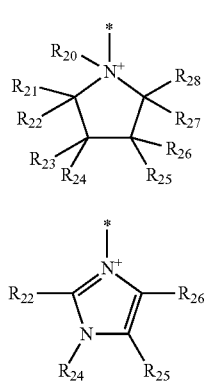

Formula 5-1

Formula 5-2 wherein, in Formula 5-1 and Formula 5-2, $R_{20}$ to $R_{28}$ are each independently hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

6. The composite membrane of claim 1, further comprising a lithium salt.

7. The composite membrane of claim 6, wherein an amount of the lithium salt is about 1 part to about 90 parts by weight, based on 100 parts by weight of a total weight of the composite membrane.

8. The composite membrane of claim 1, wherein the random copolymer has a degree of polymerization of about 10 to about 5,000.

9. The composite membrane of claim 1, wherein, in Formula 1, m is about 0.45 to about 0.8.

10. The composite membrane of claim 1, wherein the random copolymer is represented by Formula 6, and the random copolymer has a degree of polymerization of about 10 to about 5,000

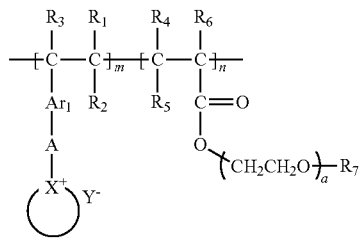

Formula 6 wherein, in Formula 6, $Ar_1$ is a substituted or unsubstituted C6-C30 arylene group, $R_1$, $R_2$, and $R_3$ are each independently hydrogen, an unsubstituted or substituted C1-C20 alkyl group, an unsubstituted or substituted C6-C20 aryl group, or an unsubstituted or substituted C3-C30 heteroaryl group, A is a chemical bond, an unsubstituted or substituted C1-C30 alkylene group, or an unsubstituted or substituted C6-C30 arylene group, $Y^-$ comprises $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3S_{02})_2CH^-$, $(SF_5)_3C^-$, $(O(CF_3)_2C_2(CF_3)_2O)_2PO^-$, or a combination thereof, m and n are each independently 0.01 to 0.99, wherein the sum of m and n is 1, each $R_7$ is independently hydrogen, an unsubstituted or substituted C1-C20 alkyl group, or unsubstituted or substituted C6-C20 aryl group, a is an integer of 1 to 10, and

comprises a group represented by Formula 5-1 or Formula 5-2,

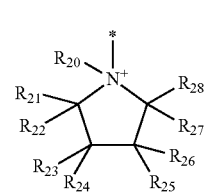

Formula 5-1

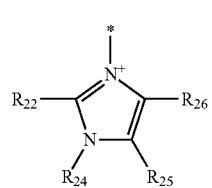

Formula 5-2 wherein, in Formula 5-1 and Formula 5-2, $R_{20}$ to $R_{28}$ are each independently hydrogen, an unsubstituted or substituted C1-C30 alkyl group, an unsubstituted or subsubstituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group; and * indicates a point of attachment.

11. The composite membrane of claim 1, wherein the random copolymer comprises a compound represented by Formula 6a, Formula 6b, Formula 6c, Formula 6d, or a combination thereof Formula 6a
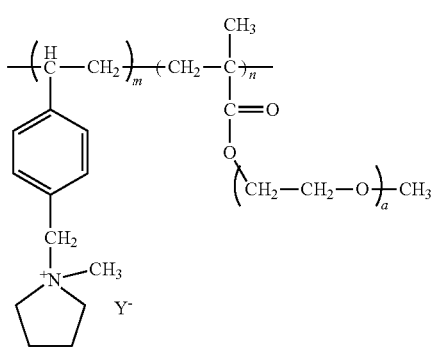

Formula 6b
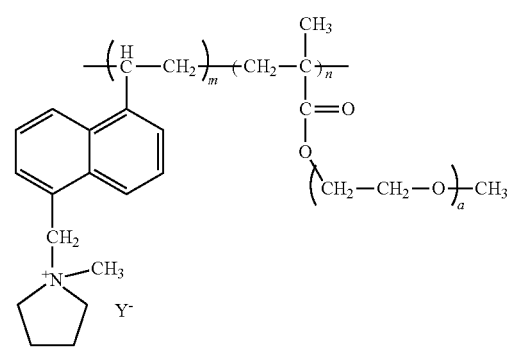

Formula 6c
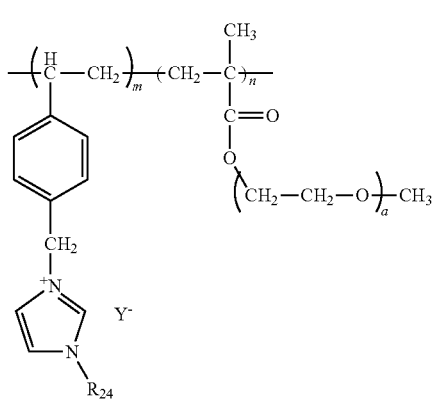

Formula 6d
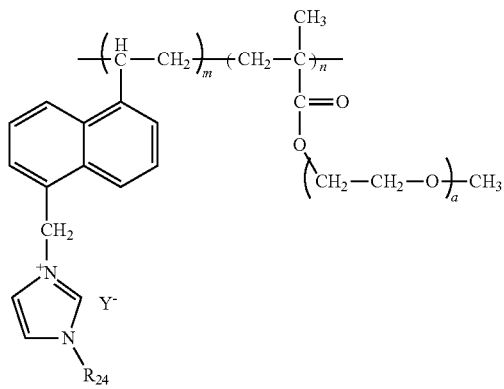

wherein, in Formulae 6a to 6d, Y comprises $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3S_{02})_2CH^-$, $(SF_5)_3C^-$, $(O(CF_3)_2C_2(CF_3)_2O)_2PO^-$, or a combination thereof, a is an integer from 1 to 10, $R_{24}$ is a C1-C10 alkyl group, m and n are each independently 0.01 to 0.99, and the sum of m and n is 1, and the random copolymer has a degree of polymerization of about 10 to 5,000.

12. The composite membrane of claim 1, wherein the composite membrane has a thickness of about 1 nanometer to about 1,000 micrometers.

13. The composite membrane of claim 1, wherein the random copolymer has a weight average molecular weight of about 3,000 Daltons to about 200,000 Daltons.

14. The composite membrane of claim 1, wherein the composite membrane maintains a form of a free-standing film at a temperature of about 25° C. to 60° C.

15. The composite membrane of claim 1, wherein the random copolymer is electrochemically stable at up to −0.4 Volts with respect to $Li/Li^+$.

16. The composite membrane of claim 1, wherein the composite membrane has a lithium ion conductivity of about 0.001 millisiemens/centimeter or greater at about 25° C.

17. A lithium battery comprising:
a cathode;
an anode; and
the composite membrane of claim 1 disposed between the cathode and the anode.

18. The lithium battery of claim 17, wherein the anode comprises lithium metal or a lithium metal alloy; or
the anode comprises an active material comprising a carbonaceous material, silicon, a silicon oxide, a silicon alloy, a silicon-carbonaceous material composite, tin, a tin alloy, a tin-carbon composite, a metal or a metalloid alloyable with lithium, an alloy comprising the metal or metalloid alloyable with lithium, an oxide of the metal or metalloid alloyable with lithium, or a combination thereof.

19. The lithium battery of claim 17, wherein the anode comprises lithium metal or a lithium metal alloy, and the composite membrane comprises an anode protection layer, or an anode protection layer and an electrolyte.

20. The lithium battery of claim 17, wherein the composite membrane comprises an electrolyte.

21. The lithium battery of claim 17, wherein the lithium battery further comprises a liquid electrolyte, a solid electrolyte, a gel electrolyte, a polymer ionic liquid, or a combination thereof.

22. The lithium battery of claim 17, wherein an operating voltage of the lithium battery is about 4 Volts or greater.

23. The lithium battery of claim 17, wherein the cathode comprises a cathode active material and a copolymer, the copolymer comprising a first repeating unit represented by Formula 1 and a second repeating unit represented by Formula 2

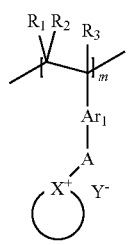

Formula 1 wherein, in Formula 1, $Ar_1$ is a substituted or unsubstituted C6-C30 arylene group or a substituted or unsubstituted C6-C30 heteroarylene group, $R_1$, $R_2$, and $R_3$ are each independently hydrogen, an unsubstituted or substituted C1-C20 alkyl group, an unsubstituted or substituted C6-C20 aryl group, or an unsubstituted or substituted C3-C30 heteroaryl group, A is a chemical bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group,

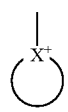

is a 3-membered to 31-membered ring system comprising 2 to 30 carbon atoms,

X is S, N, N(R), or P(R'),

R and R' are each independently hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 aryl alkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 cycloalkyl group, an unsubstituted or substituted C2-C30 alkenyl group, or an unsubstituted or substituted C3-C30 alkynyl group, and $Y^-$ is an anion,

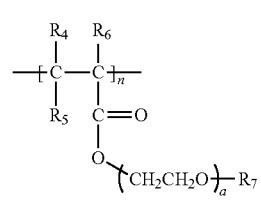

Formula 2 wherein, in Formula 2, $R_4$, $R_5$, and $R_6$ are each independently hydrogen, an unsubstituted or substituted C1-C20 alkyl group, an unsubstituted or substituted C6-C20 aryl group, or an unsubstituted or substituted C3-C30 heteroaryl group, each $R_7$ is independently hydrogen, an unsubstituted or substituted C1-C20 alkyl group, or an unsubstituted or substituted C6-C20 aryl group, and a is an integer of 1 to 10, and in Formulae 1 and 2, m and n are mole fractions of the first repeating unit represented by Formula 1 and the second repeating unit represented by Formula 2, respectively, wherein the sum of m and n is 1, and m and n are each independently greater than 0 and less than 1.

24. A cathode for a lithium battery, comprising:

a cathode active material; and a random copolymer of a first repeating unit represented by Formula 1 and a second repeating unit represented by Formula 2

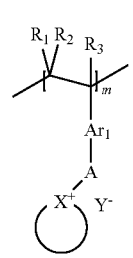

Formula 1 wherein, in Formula 1, $Ar_1$ is a substituted or unsubstituted C6-C30 arylene group or a substituted or unsubstituted C6-C30 heteroarylene group, $R_1$, $R_2$, and $R_3$ are each independently hydrogen, an unsubstituted or substituted C1-C20 alkyl group, an unsubstituted or substituted C6-C20 aryl group, or an unsubstituted or substituted C3-C30 heteroaryl group, A is a chemical bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group,

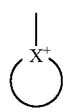

is a 3-membered to 31-membered ring system including 2 to 30 carbon atoms,

X is S, N, N(R), or P(R'),

R and R' are each independently hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 aryl alkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 cycloalkyl group, an unsubstituted or substituted C2-C30 alkenyl group, an unsubstituted or substituted C3-C30 heteroaryloxy group, an unsubstituted or substituted C3-C30 heterocycloalkyl group or an unsubstituted or substituted C3-C30 alkynyl group, and $Y^-$ is an anion

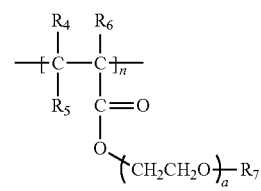

Formula 2 wherein, in Formula 2, $R_4$, $R_5$, and $R_6$ are each independently hydrogen, an unsubstituted or substituted C1-C20 alkyl group, an unsubstituted or substituted C6-C20 aryl group, or an unsubstituted or substituted C3-C30 heteroaryl group, each $R_7$ is independently hydrogen, an unsubstituted or substituted C1-C20 alkyl group, or unsubstituted or substituted C6-C20 aryl group, and a is an integer of 1 to 10, and in Formulae 1 and 2, m and n are mole fractions of the first repeating unit represented by Formula 1 and the second repeating unit represented by Formula 2, respectively, wherein the sum of m and n is 1, and m and n are each independently greater than 0 and less than 1.

* * * * *